US011815754B2

(12) United States Patent
Ku et al.

(10) Patent No.: US 11,815,754 B2
(45) Date of Patent: Nov. 14, 2023

(54) DISPLAY DEVICE AND METHOD OF DRIVING THE SAME

(71) Applicant: SAMSUNG DISPLAY CO., LTD., Yongin-si (KR)

(72) Inventors: Kyo Won Ku, Seoul (KR); Jung Hak Kim, Hwaseong-si (KR); Young Sik Kim, Yongin-si (KR); Jin Woo Kim, Hwaseong-si (KR); Jeong Heon Lee, Yongin-si (KR); Hee Yeon Choi, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/235,475

(22) Filed: Apr. 20, 2021

(65) Prior Publication Data
US 2022/0050317 A1 Feb. 17, 2022

(30) Foreign Application Priority Data
Aug. 12, 2020 (KR) ........................ 10-2020-0100899

(51) Int. Cl.
G02F 1/1333 (2006.01)
G02F 1/1503 (2019.01)
G02F 1/155 (2006.01)
G02F 1/1335 (2006.01)
G09F 9/30 (2006.01)
G09G 3/36 (2006.01)
G06V 40/13 (2022.01)
G06V 40/12 (2022.01)

(52) U.S. Cl.
CPC .... *G02F 1/13338* (2013.01); *G02F 1/133524* (2013.01); *G02F 1/133526* (2013.01); *G02F 1/1503* (2019.01); *G02F 1/155* (2013.01); *G06V 40/1306* (2022.01); *G09F 9/301* (2013.01); *G09G 3/3696* (2013.01); *G02F 2001/1555* (2013.01); *G06V 40/1341* (2022.01)

(58) Field of Classification Search
CPC ...... G06F 3/042; G06F 3/0421; G06F 3/0488; G06F 2203/0338; G06K 9/0004; G06K 9/00013
See application file for complete search history.

(56) References Cited

U.S. PATENT DOCUMENTS

| 2015/0324046 A1* | 11/2015 | Lo ........................ G06F 3/0412 345/173 |
| 2019/0179196 A1* | 6/2019 | Eguchi .............. G02F 1/133308 |
| 2020/0311372 A1* | 10/2020 | Yeh ..................... G06V 40/1318 |
| 2021/0027038 A1* | 1/2021 | Shuai .................... G02F 1/1334 |

(Continued)

FOREIGN PATENT DOCUMENTS

| CN | 110114779 A | * | 8/2019 | ........... G06K 9/0004 |
| CN | 110490097 A | * | 11/2019 | ........... G06F 1/1684 |

(Continued)

*Primary Examiner* — Yuzhen Shen
(74) *Attorney, Agent, or Firm* — F. CHAU & ASSOCIATES, LLC

(57) ABSTRACT

A display device includes a first display panel for displaying a first image, a fingerprint sensor disposed on one surface of the first display panel and detecting light passing through the first display panel, and a first light transmission control unit disposed between the first display panel and the fingerprint sensor for controlling transmission of light.

16 Claims, 24 Drawing Sheets

(56) References Cited

U.S. PATENT DOCUMENTS

2021/0341779 A1* 11/2021 Okita .................. G02F 1/13338
2022/0155627 A1* 5/2022 Mei ...................... G02B 6/0055

FOREIGN PATENT DOCUMENTS

| CN | 111164608 A | * | 5/2020 | ......... G06K 9/00046 |
| CN | 111164609 A | * | 5/2020 | ............... G06K 9/00 |
| CN | 212541359 U | * | 2/2021 | ............... G06K 9/00 |
| KR | 10-2021-0126840 | | 10/2021 | |
| WO | WO-2020215187 A1 | * | 10/2020 | ............... G06K 9/22 |

* cited by examiner

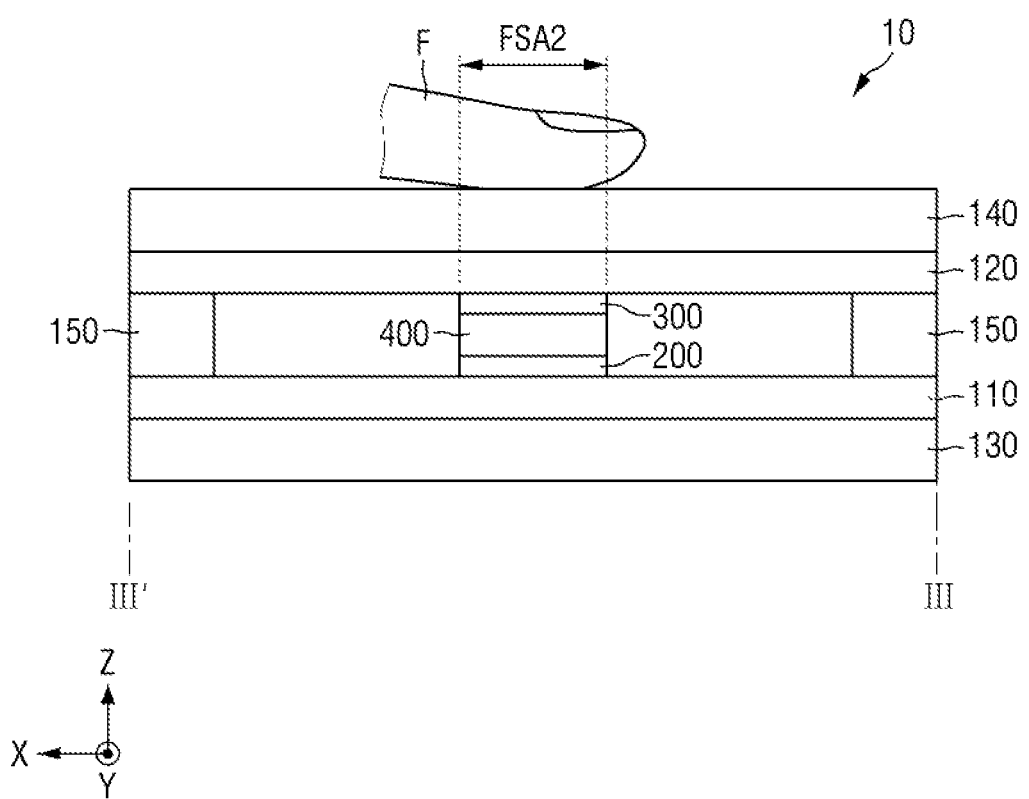

DISPLAY DEVICE AND METHOD OF DRIVING THE SAME

CROSS-REFERENCE TO RELATED APPLICATION

This application claims priority under 35 U.S.C. § 119 to Korean Patent Application No. 10-2020-0100899, filed on Aug. 12, 2020, in the Korean Intellectual Property Office, the disclosure of which is incorporated by reference herein in its entirety.

TECHNICAL FIELD

The present inventive concept relates to a display device and a method of driving the same.

DISCUSSION OF RELATED ART

With the development of information technology, requirements for display devices for displaying images have increased in various forms. For example, the display devices are applied to various mobile devices, computers and home appliances such as smart phones, smart watches, digital cameras, tablets, notebook computers, navigators, and smart televisions.

Recently, a foldable display device that is flexible and can be folded or bent has been applied to small electronic devices such as smart phones and tablet PCs to increase portability. The foldable display device may include a first display panel that displays an image forward when it is folded, and a second display panel that displays an image backward when it is unfolded. Therefore, the foldable display device may be a double-sided display device that displays images in both directions.

The foldable display device may further include a fingerprint sensor for authenticating a fingerprint, which is a user's biometric information, to protect privacy information. It may be desirable that the foldable display device is capable of detecting a fingerprint of a finger contacting the first display panel and also detecting the fingerprint of the finger contacting the second display panel. In this case, when a fingerprint sensor is attached to each of the first and second display panels of the foldable display device, manufacturing cost may increase.

SUMMARY

An aspect of the present inventive concept is to provide a display device capable of reducing manufacturing cost by recognizing a fingerprint contacting a first display panel and a fingerprint contacting a second display panel using one fingerprint sensor disposed between the first display panel displaying an image forward and the second display panel displaying an image backward.

Another aspect of the present inventive concept is to provide a method of driving a display device capable of reducing manufacturing cost by attaching one fingerprint sensor between a first display panel displaying an image in a front direction and a second display panel displaying an image in a rear direction.

A display device includes a first display panel for displaying a first image, a fingerprint sensor disposed on one surface of the first display panel and detecting light passing through the first display panel, and a first light transmission control unit disposed between the first display panel and the fingerprint sensor for controlling transmission of light.

The first light transmission control unit may include a first base substrate and a second base substrate facing each other, a first electrode disposed on one surface of the first base substrate, a second electrode disposed on one surface of the second base substrate facing the first base substrate, and a light transmission control layer disposed between the first electrode and the second electrode.

The light transmission control layer may include an electrochromic layer disposed on one surface of the second electrode facing the first electrode and configured to change a color according to an oxidation-reduction reaction by a first driving voltage applied to the first electrode and a second driving voltage applied to the second electrode, a counter layer disposed on one surface of the first electrode facing the second electrode and located between the first electrode and the electrochromic layer for assisting the oxidation-reduction reaction of the electrochromic layer, and an electrolyte layer disposed between the electrochromic layer and the counter layer for providing cations and anions to cause the oxidation-reduction reaction in the electrochromic layer and the counter layer.

When the first driving voltage is a positive voltage and the second driving voltage is a negative voltage, the electrochromic layer may be in a light blocking mode in which light passing through the first display panel and incident to the fingerprint sensor is blocked.

When the first driving voltage is a negative voltage and the second driving voltage is a positive voltage, the electrochromic layer may be in a light transmission mode in which light passing through the first display panel and incident to the fingerprint sensor is transmitted.

The light transmission control layer may include a liquid crystal layer having liquid crystal molecules.

When an electric field is applied by the first electrode and the second electrode, the liquid crystal layer may be in a light blocking mode in which light passing through the first display panel and incident to the fingerprint sensor is blocked.

When an electric field is not applied by the first electrode and the second electrode, the liquid crystal layer may be in a light transmission mode in which light passing through the first display panel and incident to the fingerprint sensor is transmitted.

The display device may further include a second display panel for displaying a second image, and a second light transmission control unit disposed between the second display panel and the fingerprint sensor for controlling transmission of light.

When a touch event occurs in the first display panel, the first light transmission control unit may be in a light transmission mode for transmitting light such that light passing through the first display panel is incident on the fingerprint sensor, and the second light transmission control unit may be in a light blocking mode for blocking light.

When a touch event occurs in the second display panel, the second light transmission control unit may be in a light transmission mode for transmitting light such that light passing through the second display panel is incident on the fingerprint sensor, and the first light transmission control unit may be in a light blocking mode for blocking light.

The display device may further include a first light guide unit disposed between the first display panel and the first light transmission control unit for providing light passing through the first display panel to a light sensing element of the fingerprint sensor, and a second light guide unit disposed between the second display panel and the second light transmission control unit for providing light passing through the second display panel to the light sensing element of the fingerprint sensor.

The display device may further include a first light guide unit disposed between the first light transmission control unit and the fingerprint sensor for providing light passing through the first display panel to a light sensing element of the fingerprint sensor, and a second light guide unit disposed between the second light transmission control unit and the fingerprint sensor for providing light passing through the second display panel to the light sensing element of the fingerprint sensor.

A display device includes a first display panel, a second display panel disposed on one surface of the first display panel, a fingerprint sensor disposed between the first display panel and the second display panel, a first light guide unit disposed between the first display panel and the fingerprint sensor and providing light passing through the first display panel to a light sensing element of the fingerprint sensor, and a second light guide unit disposed between the second display panel and the fingerprint sensor and providing light passing through the second display panel to the light sensing element of the fingerprint sensor.

Each of the first light guide unit and the second light guide unit may include any one of a lens array including a plurality of lenses, a collimator including a light transmitting portion transmitting light and a light blocking portion blocking light, and a light blocking layer including pinholes transmitting light.

The first light guide unit may include a lens array including a plurality of lenses, and the second light guide unit may include a collimator including a light transmitting portion transmitting light and a light blocking portion blocking light, or a light blocking layer including pinholes transmitting light.

The first light guide unit may include a collimator including a light transmitting portion transmitting light and a light blocking portion blocking light, and the second light guide unit may include a lens array including a plurality of lenses, or a light blocking layer including pinholes transmitting light.

The first light guide unit may include a light blocking layer including pinholes transmitting light, and the second light guide unit may include a lens array including a plurality of lenses, or a collimator including a light transmitting portion transmitting light and a light blocking portion blocking light.

The display device may further include a first light transmission control unit disposed between the first display panel and the fingerprint sensor and controlling transmission of light; and a second light transmission control unit disposed between the second display panel and the fingerprint sensor and controlling transmission of light.

A method of driving a display device includes determining whether a touch event occurs in a first display panel and a second display panel disposed on one surface of the first display panel, implementing a first light transmission control unit disposed between the first display panel and a fingerprint sensor in a light transmission mode for transmitting light such that light passing through the first display panel is incident on the fingerprint sensor, when the touch event occurs in the first display panel; implementing a second light transmission control unit disposed between the second display panel and the fingerprint sensor in a light blocking mode for blocking light, when the touch event occurs in the first display panel; implementing the second light transmission control unit in a light transmission mode for transmitting light such that light passing through the second display panel is incident on the fingerprint sensor, when the touch event occurs in the second display panel, and implementing the first light transmission control unit in a light blocking mode for blocking light, when the touch event occurs in the second display panel.

A display device includes a first display panel that is not bent or folded for displaying a first image in a front direction of the display device, a second display panel that is capable of being bent or folded attached to the first display panel and displaying a second image in a rear direction of the display device, and a fingerprint sensor disposed between the first display panel and the second display panel and detecting light passing through the first display panel or light passing through the second display panel.

The display device may further include a first light transmission control unit disposed between the first display panel and the fingerprint sensor, and a second light transmission control unit disposed between the second display panel and the fingerprint sensor, in which, when a touch event occurs in the first display panel, the first light transmission control unit is in a light transmission mode for transmitting light such that light passing through the first display panel is incident on the fingerprint sensor, and the second light transmission control unit is in a light blocking mode for blocking light, and when a touch event occurs in the second display panel, the second light transmission control unit is in a light transmission mode for transmitting light such that light passing through the second display panel is incident on the fingerprint sensor, and the first light transmission control unit is in a light blocking mode for blocking light.

BRIEF DESCRIPTION OF THE DRAWINGS

The above and other features of the present inventive concept will become more apparent by describing in detail embodiments thereof with reference to the accompanying drawings, in which:

FIGS. 22A and 22B are cross-sectional views illustrating display devices according to an embodiment of the present inventive concept.

Figure 1:
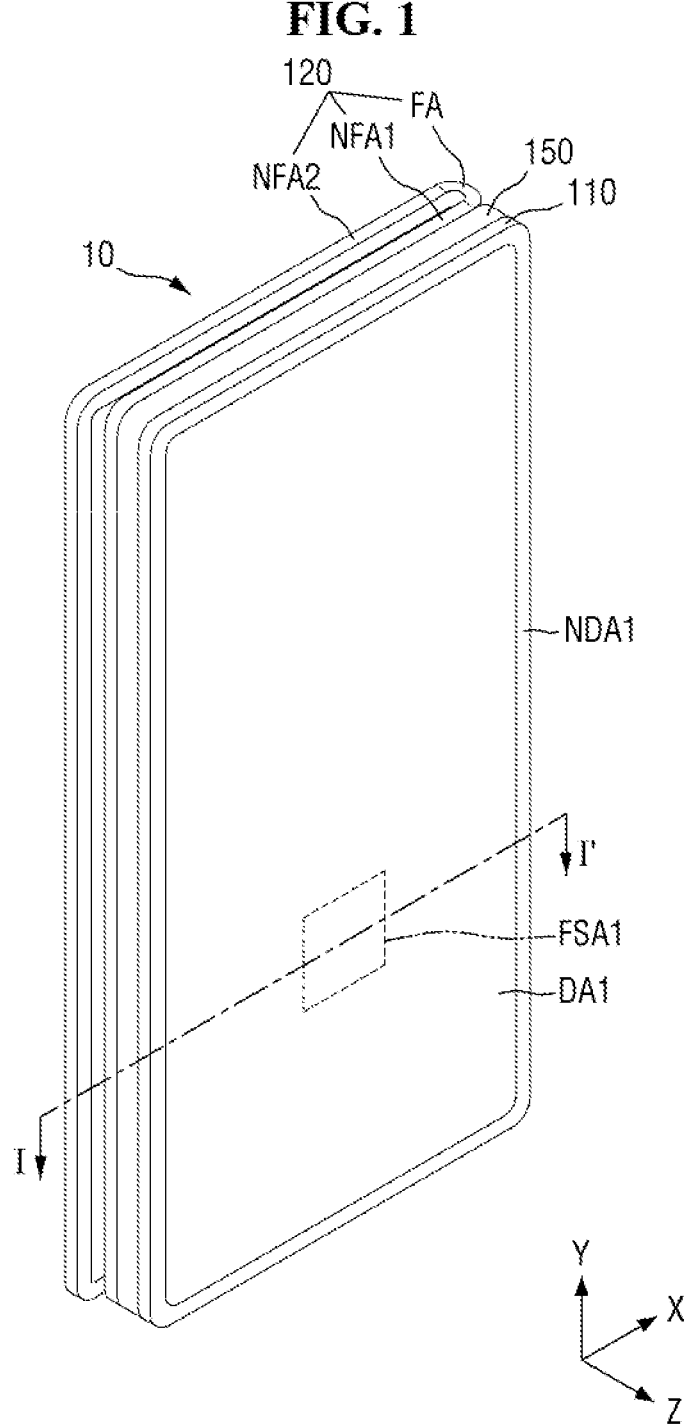
FIG. 1 is a perspective view illustrating a folded state of a display device according to an embodiment of the present inventive concept.

Since the drawings in FIGS. 1-22 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

Embodiments of the present inventive concept will be described more fully hereinafter with reference to the accompanying drawings. Like reference numerals may refer to like elements throughout the specification and the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationship between elements may be interpreted in a like fashion.

It will be further understood that descriptions of features or aspects within each embodiment are available for other similar features or aspects in other embodiments, unless the context clearly indicates otherwise. Thus, it is contemplated that all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below.

The term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Figure 2:
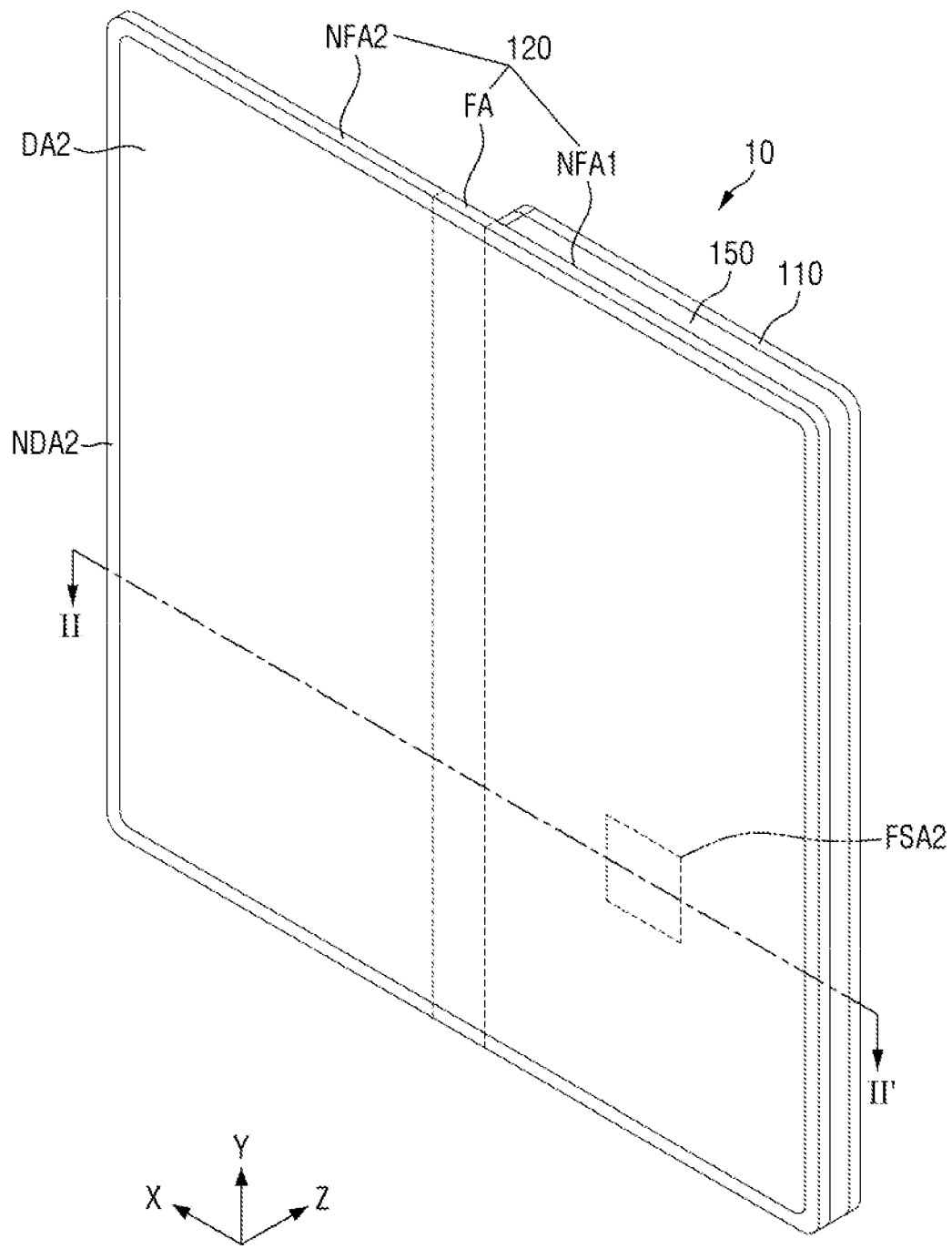
FIG. 2 is a perspective view illustrating an unfolded state of a display device according to an embodiment of the present inventive concept.

FIG. 1 is a perspective view illustrating a folded state of a display device according to an embodiment of the present inventive concept, and FIG. 2 is a perspective view illustrating an unfolded state of a display device according to an embodiment of the present inventive concept.

Referring to FIGS. 1 and 2, a display device 10 according to an embodiment of the present inventive concept includes a first display panel 110 having a first display area DA1 and a second display panel 120 having a second display area DA2. While the first display panel 110 is not bent or folded, the second display panel 120 may be bent or folded. That is, the display device 10 may be a foldable display device. While the first display area DA1 of the first display panel 110 faces the front direction of the display device 10 as shown in FIG. 1, the second display area DA2 of the second display panel 120 may face the rear direction of the display device 10 in an unfolded state as shown in FIG. 2.

The first display panel 110 may have a rectangular shape, and may have short sides in the first direction (X-axis direction) and long sides in the second direction (Y-axis direction). The corner where the short side in the first direction (X-axis direction) meets the long side in the second direction (Y-axis direction) may be formed to have a round shape with a predetermined curvature or have a right-angled shape. The planar shape of the first display panel 110 may be formed in another polygonal shape (e.g., square shape, triangular shape, or other shapes with more than four sides), circular shape, or elliptical shape in addition to the rectangular shape.

The first display panel 110 includes a first display area DA1 and a first non-display area NDA1. The first display area DA1 is an area in which pixels are arranged to display an image. The first non-display area NDA1 is an area that does not display an image because pixels are not arranged. The first non-display area NDA1 may be disposed around the first display area DA1. For example, the first non-display area NDA1 may be disposed to surround the first display area DA1.

The second display panel 120 may include a first non-folding area NFA1, a second non-folding area NFA2, and a folding area FA. The first non-folding area NFA1 may extend from one side of the folding area FA, and the second non-folding area NFA2 may extend from the other side of the folding area FA. For example, the surface of the second display area DA2 together with the surface of the second non-display area NDA2 may include display surfaces of the first non-folding area NFA1, the folding area FA, and the second non-folding area NFA2. The second display panel 120 may not be bent or folded in the first non-folding area NFA1 and the second non-folding area NFA2. The area of the first non-folding area NFA1 and the area of the second non-folding area NFA2 may be substantially the same as each other, but the present inventive concept is not limited thereto.

The second display panel 120 may be bent or folded in the folding area FA. To help the second display panel 120 be bent or folded in the folding area FA, a hinge may be disposed on the lower surface of the second display panel 120 in the folding area FA. For example, the first non-folding area NFA1 and the second non-folding area NFA2 may each have one flat surface, and may not be folded or bent, while the folding area FA may have a flat surface located on a plane the same as that of the surfaces of the first non-folding area NFA1 and the second non-folding area NFA2 in an unfolded state, but it may be folded or bent to have a curved surface. The area of the folding area FA may be smaller than the area of the first non-folding area NFA1 or the area of the second non-folding area NFA2, but the present inventive concept is not limited thereto.

The second display panel 120 includes a second display area DA2 and a second non-display area NDA2. The second display area DA2 is an area in which pixels are arranged to display an image. The second non-display area NDA2 is an area that does not display an image because pixels are not disposed. The second non-display area NDA2 may be disposed around the second display area DA2. For example, the second non-display area NDA2 may be disposed to surround the second display area DA2. The second display panel 120 is in-folded such that the second display area DA2 of the first non-folding area NFA1 and the second display area DA2 of the second non-folding area NFA2 face each other. One folding area FA is shown in FIG. 2, but the present inventive concept is not limited thereto. For example, in an embodiment of the present inventive concept, the display device 10 may be a multi-foldable display device including a plurality of folding areas. Some of the folding areas may be in-folded, and some of the folding areas may be out-folded.

The second display panel 120 may have a rectangular planar shape in a folded state and an unfolded state. For example, the second display panel 120 may have a rectangular planar shape having short sides in the first direction (X-axis direction) and long sides in the second direction (Y-axis direction) in a folded state. Further, the second display panel 120 may have a rectangular planar shape having long sides in the first direction (X-axis direction) and short sides in the second direction (Y-axis direction) in an unfolded state. In the folded state and the unfolded state, the planar shape of the second display panel 120 is not limited to a rectangle, and the second display panel 120 may be formed in the shape of another polygon (e.g., square, triangle, or other shapes with more than four sides) other than the rectangle, a circle, or an ellipse.

When the second display panel 120 is folded, the first display area DA1 of the first display panel 110 includes a first fingerprint sensing area FSA1. The first fingerprint sensing area FSA1 indicates an area where a fingerprint sensor (400 in FIGS. 3 and 4) is disposed. The first fingerprint sensing area FSA1 may be a part of the first display area DA1 as shown in FIG. 1. Alternatively, the first fingerprint sensing area FSA1 may be the entire area of the first display area DA1, and in this case, may be substantially the same as the first display area DA1. Also, in this case, as indicated by the first fingerprint sensing area FSA1, the fingerprint sensor 400 may be disposed under the entire area of the first display area DA1.

When the second display panel 120 is unfolded, the second display area DA2 of the second display panel 120 includes a second fingerprint sensing area FSA2. The second fingerprint sensing area FSA2 indicates an area where the fingerprint sensor (400 in FIGS. 3 and 4) is disposed. The second fingerprint sensing area FSA2 may be a part of the second display area DA2 as shown in FIG. 2. Alternatively, the second fingerprint sensing area FSA2 may be the entire area of the second display area DA2, and in this case, may be substantially the same as the second display area DA2. Also, in this case, as indicated by the second fingerprint sensing area FSA2, the fingerprint sensor 400 may be disposed above the entire area of the second display area DA2.

As shown in FIGS. 1 and 2, when the second display panel 120 is folded, the display device 10 may display a first image in the front direction using the first display panel 110. Further, when the second display panel 120 is unfolded, the display device 10 may display a second image in the rear direction using the second display panel 120. When the second display panel 120 is unfolded, the first display panel 110 may display the first image in the front direction, or may not display any image. For example, the display device 10 may display an image or images on the front and rear surfaces thereof, that is, both surfaces thereof.

Figure 3:
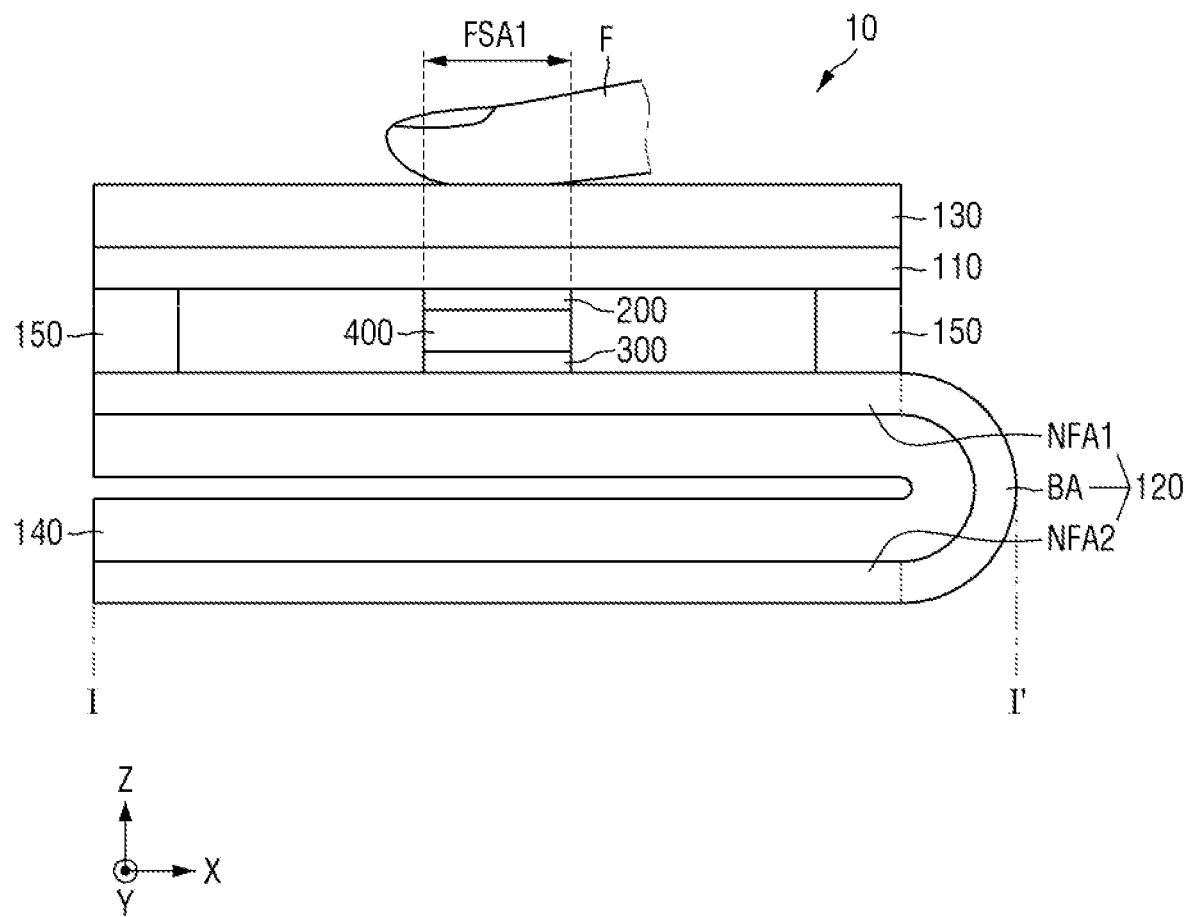
FIG. 3 is a cross-sectional view illustrating a folded state of a display device according to an embodiment of the present inventive concept.
Figure 4:
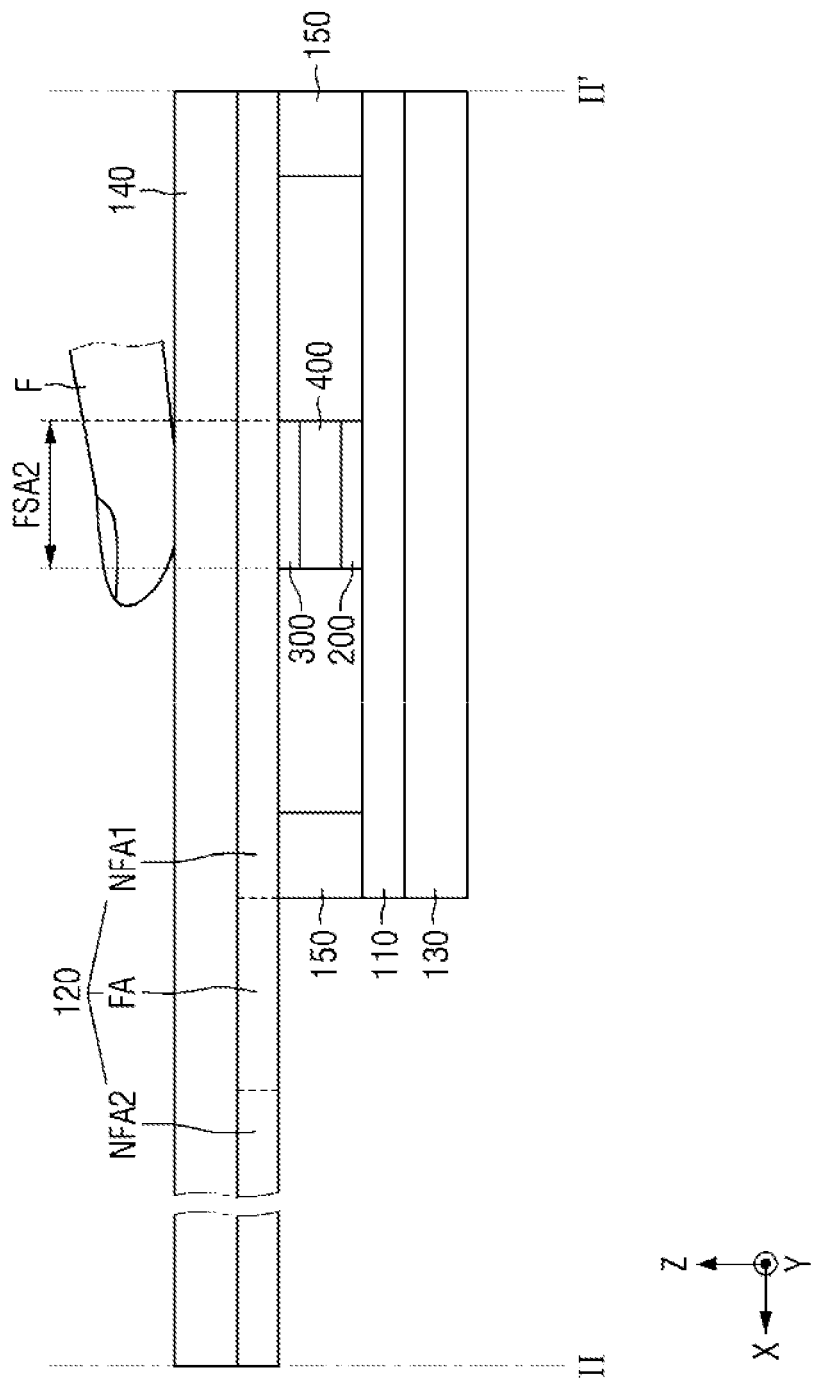
FIG. 4 is a cross-sectional view illustrating an unfolded state of a display device according to an embodiment of the present inventive concept.

FIG. 3 is a cross-sectional view illustrating a folded state of a display device according to an embodiment of the present inventive concept, and FIG. 4 is a cross-sectional view illustrating an unfolded state of a display device according to an embodiment of the present inventive concept. FIG. 3 is a cross-sectional view taken along line I-I' of FIG. 1, and FIG. 4 is a cross-sectional view taken along line II-II' of FIG. 2. For ease of explanation, FIG. 4 is illustrated in an upside down configuration.

Referring to FIGS. 3 and 4, the display device 10 further includes a first cover window 130, a second cover window 140, an adhesive member 150, a first light transmission control unit 200, a second light transmission control unit 300, and a fingerprint sensor 400 in addition to the first display panel 110 and the second display panel 120.

The first cover window 130 may be disposed on the first display panel 110 to cover the front surface of the first display panel 110. Accordingly, the first cover window 130 may function to protect the front surface of the first display panel 110. The front surface of the first display panel 110 indicates a display surface on which an image is displayed.

The second cover window 140 may be disposed under the second display panel 120 to cover the rear surface of the second display panel 120. Accordingly, the second cover window 140 may function to protect the rear surface of the second display panel 120. The rear surface of the second display panel 120 indicates a display surface on which an image is displayed.

The second cover window 140 may be bent or folded. Accordingly, the second cover window 140 may be folded together with the second display panel 120 in the folding area FA.

Each of the first cover window 130 and the second cover window 140 may be made of a transparent insulating material, and may be glass, quartz or plastic. For example, each of the first cover window 130 and the second cover window 140 may be ultra-thin glass (UTG) having a thickness of about 0.1 mm or less. Alternatively, each of the first cover window 130 and the second cover window 140 may be a transparent polyimide film.

The adhesive member 150 may be disposed between the first display panel 110 and the second display panel 120, for example, disposed between the first display panel 110 and the first non-folding area NFA1 of the second display panel 120. The adhesive member 150 may be disposed at an edge of the first display panel 110 and an edge of the first non-folding area NFA1. For example, the adhesive member 150 may overlap the first non-display area NDA1 of the first display panel 110 in the third direction (Z-axis direction). Also, the adhesive member 150 may overlap a portion of the second non-display area NDA2 in the first non-folding area NFA1 and a portion of the second display area DA2 in the first non-folding area NFA1 adjacent to the folding area FA of the second display panel 120. The front surface of the adhesive member 150 may be attached to the rear surface of the first display panel 110, and the rear surface of the adhesive member 150 may be attached to the front surface of the second display panel 120. The first display panel 110 and the second display panel 120 may be attached to each other by the adhesive member 150. The adhesive member 150 may be a pressure sensitive adhesive. Alternatively, the adhesive member 150 may include a heat curable resin or a photocurable resin.

The fingerprint sensor 400 may be disposed between the first display panel 110 and the second display panel 120, and may sense light reflected from a fingerprint of a finger located in the first fingerprint sensing area FSA1 of the first display panel 110. For example, when a finger F contacts the first fingerprint sensing area FSA1 of the first display panel 110, the first display panel 110 may output predetermined light. The light output from the first display panel 110 may be reflected from the ridge and valley of the fingerprint of the finger F. In this case, the amount of light reflected from the ridge of the fingerprint of the finger F may be different from the amount of light reflected from the valley of the fingerprint of the finger F. A fingerprint driving circuit electrically connected to the fingerprint sensor 400 may determine whether the light reflected from the fingerprint of the finger F is the light reflected from the ridge of the fingerprint of the finger F or the light reflected from the valley of the fingerprint of the finger F according to the amount of light incident on sensor pixels of the fingerprint sensor 400. For example, the fingerprint sensor 400 disposed between the first display panel 110 and the second display panel 120 may detect the light, which may contain the fingerprint information, passing through the first display panel 110. Accordingly, the display device 10 may sense the fingerprint of the finger F contacting the first fingerprint sensing area FSA1 of the first display panel 110.

The fingerprint sensor 400 may also sense light reflected from a fingerprint of a finger located in the second fingerprint sensing area FSA2 of the second display panel 120. For example, when a finger F contacts the second fingerprint sensing area FSA2 of the second display panel 120, the second display panel 120 may output predetermined light. The light output from the second display panel 120 may be reflected from the ridge and valley of the fingerprint of the finger F. In this case, the amount of light reflected from the ridge of the fingerprint of the finger F may be different from the amount of light reflected from the valley of the fingerprint of the finger F. The fingerprint driving circuit electrically connected to the fingerprint sensor 400 may determine whether the light reflected from the fingerprint of the finger F is the light reflected from the ridge of the fingerprint of the finger F or the light reflected from the valley of the fingerprint of the finger F according to the amount of light incident on sensor pixels of the fingerprint sensor 400. For example, the fingerprint sensor 400 disposed between the first display panel 110 and the second display panel 120 may detect the light, which may contain the fingerprint information, passing through the second display panel 120. Accordingly, the display device 10 may sense the fingerprint of the finger F contacting the second fingerprint sensing area FSA2 of the second display panel 120. Thus, the fingerprint sensor 400 disposed between the first display panel 110 and the second display panel 120 may detect the light passing through the first display panel 110 when a finger F contacts the first fingerprint sensing area FSA1 of the first display panel 110, and the same fingerprint sensor 400 disposed between the first display panel 110 and the second display panel 120 may detect the light passing through the second display panel 120 when a finger F contacts the second fingerprint sensing area FSA2 of the second display panel 120.

The first light transmission control unit 200 may be disposed between the first display panel 110 and the fingerprint sensor 400. The first light transmission control unit 200 controls light passing through the first display panel 110 to be incident on the fingerprint sensor 400, and may transmit most of the incident light in a light transmission mode. For example, the light transmittance of the first light transmission control unit 200 in the light transmission mode may be about 60% or more. Further, the first light transmission control unit 200 may block most of the incident light in a light blocking mode. For example, the light transmittance of the first light transmission control unit 200 in the light blocking mode may be about 40% or less.

The second light transmission control unit 300 may be disposed between the second display panel 120 and the fingerprint sensor 400. The second light transmission control unit 300 controls light passing through the second display panel 120 to be incident on the fingerprint sensor 400, and may transmit most of the incident light in the light transmission mode. For example, the light transmittance of the second light transmission control unit 300 in the light transmission mode may be about 60% or more. Further, the second light transmission control unit 300 may block most of the incident light in the light blocking mode. For example, the light transmittance of the second light transmission control unit 300 in the light blocking mode may be about 40% or less.

As shown in FIGS. 6 and 9 to 19, a first light guide unit 510 may be disposed on one surface of the first light transmission control unit 200, and a second light guide unit 520 may be disposed on one surface of the second light transmission control unit 300. Thus, the first light guide unit 510 may be disposed between the first display panel 110 and the fingerprint sensor 400, and the second light guide unit 520 may be disposed between the second display panel 120 and the fingerprint sensor 400. Details of the first light guide unit 510 and the second light guide unit 520 will be described later with reference to FIGS. 6 and 9 to 19.

As shown in FIGS. 3 and 4, one fingerprint sensor 400 is disposed between the first display panel 110 displaying a first image in the front direction and the second display panel 120 displaying a second image in the rear direction. Further, the first light transmission control unit 200 is disposed between the first display panel 110 and the fingerprint sensor 400 to control light passing through the first display panel 110 to be incident on the fingerprint sensor 400. For example, the first light transmission control unit 200 may switch between the light transmission mode and the light blocking mode to control light passing through the first display panel 110. Further, the second light transmission control unit 300 is disposed between the second display panel 120 and the fingerprint sensor 400 to control light passing through the second display panel 120 to be incident on the fingerprint sensor 400. For example, the second light transmission control unit 300 may switch between the light transmission mode and the light blocking mode to control light passing through the second display panel 120. Accordingly, when the user's finger F contacts the first display panel 110, the first light transmission control unit 200 may be implemented in the light transmission mode, and the second light transmission control unit 300 may be implemented in the light blocking mode, thereby sensing the light reflected from the fingerprint of the finger F. Further, when the user's finger F contacts the second display panel 120, the first light transmission control unit 200 may be implemented in the light blocking mode, and the second light transmission control unit 300 may be implemented in the light transmission mode, thereby sensing the light reflected from the fingerprint of the finger F. Therefore, the display device 10 may use one fingerprint sensor 400 to sense the fingerprint of the finger F contacting the first display panel 110 and the fingerprint of the finger F contacting the second display panel 120. Therefore, since it is not necessary to attach a fingerprint sensor to each display panel, the manufacturing cost of the display device 10 may be reduced. In other words, one fingerprint sensor is used instead of two fingerprint sensors to reduce manufacturing cost.

Although it is illustrated in FIG. 3 that the first light transmission control unit 200 and the fingerprint sensor 400 directly contact each other, the second light transmission control unit 300 and the fingerprint sensor 400 directly contact each other, the first display panel 110 and the first light transmission control unit 200 directly contact each other, and the second display panel 120 and the second light transmission control unit 300 directly contact each other, the present inventive concept is not limited thereto. For example, adhesive members may be disposed between the first light transmission control unit 200 and the fingerprint sensor 400, between the second light transmission control unit 300 and the fingerprint sensor 400, between the first display panel 110 and the first light transmission control unit 200 and between the second display panel 120 and the second light transmission control unit 300, and other members may be additionally disposed in addition to the adhesive members. The adhesive members may be transparent.

Figure 5:
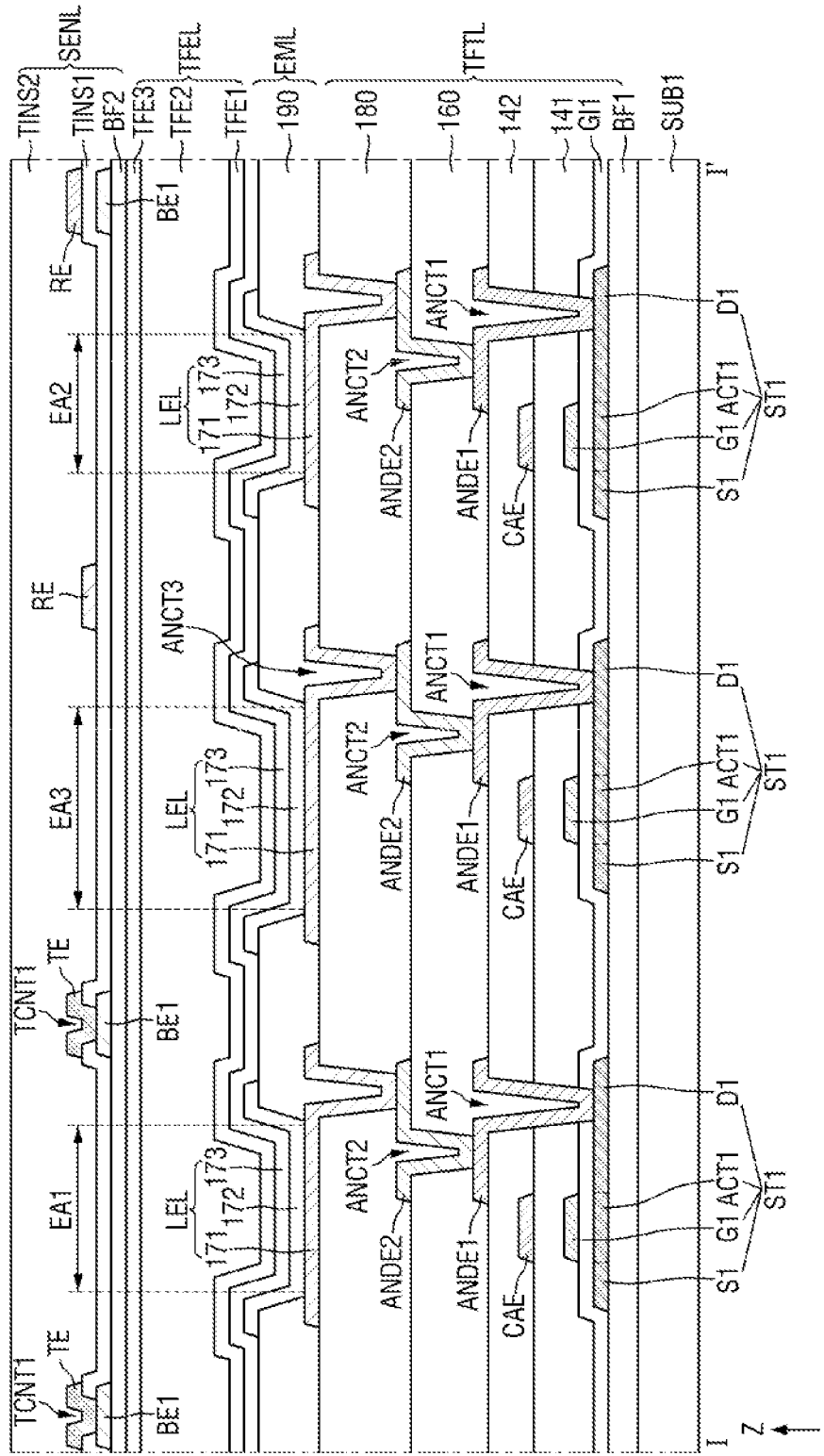
FIG. 5 is a cross-sectional view illustrating an example of a first display area of the display panel of FIGS. 3 and 4.

FIG. 5 is a cross-sectional view illustrating an example of a first display area of the display panel of FIGS. 3 and 4.

Although it is illustrated in FIG. 5 that the first display panel 110 is an organic light emitting display panel including an organic light emitting diode as a light emitting element, the present inventive concept is not limited thereto. For example, the first display panel 110 may be a quantum dot light emitting display panel including a quantum dot layer in addition to the organic light emitting diode, an inorganic light emitting display panel including an inorganic semiconductor element as a light emitting element, or a nano light emitting display panel including a micro or nano light emitting diode (micro LED or nano LED) as a light emitting element. The quantum dot layer of the quantum dot light emitting display panel may include quantum dots, quantum rods, and the like. The quantum dots and the quantum rods may be small semiconductor particles which are several nanometers in size.

The first display panel 110 includes a first substrate SUB1, and a thin film transistor layer TFTL, a light emitting element layer EML, an encapsulation layer TFEL, and a touch sensing layer SENL sequentially disposed on the first substrate.

The thin film transistor layer TFTL includes a first transistor ST1 formed as a thin film transistor, a capacitor electrode CAE, a first anode connection electrode ANDE1, a second anode connection electrode ANDE2, a first buffer layer BF1, a first gate insulating layer GI1, a first interlayer insulating layer 141, a second interlayer insulating layer 142, a first planarization layer 160, and a second planarization layer 180.

The first substrate SUB1 may be made of an insulating material such as glass or polymer resin. For example, when the first substrate SUB1 is a flexible substrate capable of bending, folding, rolling, or the like, it may be made of polyimide.

The first buffer layer BF1 protects the first transistors ST1 of the thin film transistor layer TFTL and the light emitting layer 172 of the light emitting element layer EML from moisture permeating from the first substrate SUB1 which is vulnerable to moisture permeation. The buffer layer BF1 may include an inorganic material such as oxide or nitride, an organic material, or a combination of an organic material and an inorganic material, and may have a single or multi-layer structure including an inorganic material and an organic material. For example, the first buffer layer BF1 may be formed of an inorganic layer such as, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The first transistor ST1 may be disposed on the first buffer layer BF1, and may include a first active layer ACT1, a first gate electrode G1, a first source electrode S1, and a first drain electrode D1.

The first active layer ACT1, the first source electrode S1, and the first drain electrode D1 of the first transistor ST1 may be disposed on the first buffer layer BF1. The first active layer ACT1 of the first transistor ST1 includes polycrystalline silicon (p-Si), monocrystalline silicon (Si), low-temperature polycrystalline silicon (p-Si), amorphous silicon (a-Si:H), or an oxide semiconductor. In an embodiment of the present inventive concept, the first active layer ACT1 of the first transistor ST1 may include an oxide of at least one material selected from, for example, indium (In), gallium (Ga), stannum (Sn), zirconium (Zr), vanadium (V), hafnium (Hf), cadmium (Cd), germanium (Ge), chromium (Cr), titanium (Ti), and zinc (Zn). The first active layer ACT1 overlapping the first gate electrode G1 in the third direction (Z-axis direction) that is a thickness direction of the first substrate SUB1 may be defined as a channel region. The first source electrode S1 and the first drain electrode D1 are regions that do not overlap the first gate electrode G1 in the third direction (Z-axis direction), and may include a silicon (Si) semiconductor or an oxide semiconductor doped with ions or impurities to have conductivity.

The first gate insulating layer GI1 may be disposed on the first active layer ACT1, the first source electrode S1, and the first drain electrode D1 of the first transistor ST1. The first gate insulating layer GI1 may be formed of an inorganic layer such as, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer. The first gate insulating layer GI1 may have a single or multi-layer structure including the above inorganic insulating material or materials.

The first gate electrode G1 of the first transistor ST1 may be disposed on the first gate insulating layer GI1, and may overlap the active layer ACT1 in the third direction (Z-axis direction). The first gate electrode G1 may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof.

The first interlayer insulating layer 141 may be disposed on the first gate electrode G1 of the first transistor ST1. The first interlayer insulating layer 141 may be formed of an inorganic layer such as, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The capacitor electrode CAE may be disposed on the first interlayer insulating layer 141, and may overlap the first gate electrode G1 of the first transistor ST1 in the third direction (Z-axis direction). Since the first interlayer insulating layer 141 has a predetermined dielectric constant, a capacitor may be formed by the capacitor electrode CAE, the first gate electrode G1, and the first interlayer insulating layer 141 disposed therebetween. The capacitor electrode CAE may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof.

FIG. 5 illustrates that the first gate electrode G1 of the first transistor ST1 overlaps the capacitor electrode CAE to form a capacitor for convenience of description, but the present inventive concept is not limited thereto. For example, the capacitor may be formed by overlapping a separate electrode and the capacitor electrode CAE in addition to the first gate electrode G1 of the first transistor ST1. For example, the capacitor may not overlap the first transistor ST1, and thus, the capacitor electrode CAE may overlap a separate electrode instead of the first gate electrode G1 to form the capacitor. For example, the capacitor may be formed by overlapping the gate electrode of a transistor other than the first transistor ST1 and the capacitor electrode CAE.

The second interlayer insulating layer 142 may be disposed on the capacitor electrode CAE. The second interlayer insulating layer 142 may be formed of an inorganic layer such as, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The first anode connection electrode ANDE1 may be disposed on the second interlayer insulating layer 142, and may be connected to the first drain electrode D1 of the first transistor ST1 through a first connection contact hole ANCT1 penetrating the first gate insulating layer GI1, the first interlayer insulating layer 141, and the second interlayer insulating layer 142. The first anode connection electrode ANDE1 may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof. In an embodiment of the present inventive concept, the first anode connection electrode ANDE1 may have a multi-layer structure, for example, a tri-layer structure, including Ti/Al/Ti.

The first planarization layer 160 for flattening a step due to the first transistor ST1 may be disposed on the first anode connection electrode ANDE1. For example, the first planarization layer 160 may have a flat top. When the first planarization layer 160 is to be formed, a layer may be formed and then a chemical mechanical polishing (CMP) process may be performed on a top surface of the layer to provide a flat top surface. When the first planarization layer 160 is formed through a spin coating process, a flat top surface may be obtained through the coating and baking process without performing a chemical mechanical polishing (CMP) process. The first planarization layer 160 may be formed of an organic layer including, for example, an acrylic resin, an epoxy resin, a phenolic resin, a polyamide resin, or a polyimide resin.

The second anode connection electrode ANDE2 may be disposed on the first planarization layer 160, and may be connected to the first anode connection electrode ANDE1 through a second connection contact hole ANCT2 penetrating the first planarization layer 160. The second anode connection electrode ANDE2 may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof.

The second planarization layer 180 may be disposed on the second anode connection electrode ANDE2. The second planarization layer 180 is formed of an organic layer including, for example, an acrylic resin, an epoxy resin, a phenolic resin, a polyamide resin, or a polyimide resin.

Light emitting elements LEL and a bank 190 may be disposed on the second planarization layer 180. Each of the light emitting elements LEL includes a pixel electrode 171, a light emitting layer 172, and a common electrode 173.

The pixel electrode 171 may be disposed on the second planarization layer 180, and may be connected to the second anode connection electrode ANDE2 through a third connection contact hole ANCT3 penetrating the second planarization layer 180.

In a top emission structure in which light is emitted from the light emitting layer 172 toward the common electrode 173, the pixel electrode 171 may include a metal material having high reflectance such as, for example, a laminated structure (Ti/Al/Ti) of aluminum (Al) and titanium (Ti), a laminated structure (ITO/Al/ITO) of aluminum (Al) and indium tin oxide (ITO), a laminated structure (ITO/Ag/ITO) of silver (Ag) and ITO, an APC alloy, or a laminated structure (ITO/APC/ITO) of an APC alloy and ITO. The APC alloy refers to an alloy of silver (Ag), palladium (Pd), and copper (Cu). Alternatively, the pixel electrode 171 may include a transparent conductive oxide such as, for example, indium tin oxide (ITO), indium zinc oxide (IZO), zinc oxide (ZnO), indium oxide ($In_2O_3$), indium gallium oxide (IGO), or aluminum zinc oxide (AZO).

The bank 190 may be formed to partition the pixel electrode 171 on the second planarization layer 180 to define a first light emitting area EA1, a second light emitting area EA2, and a third light emitting area EA3. The bank 190 may prevent an arc or the like from occurring between the pixel electrode 171 and the common electrode 173 by increasing a distance between the edge of the pixel electrode 171 and the common electrode 173 located over the pixel electrode 171. The bank 190 may be formed of an organic layer including, for example, an acrylic resin, an epoxy resin, a phenolic resin, a polyamide resin, or a polyimide resin.

Each of the first light emitting area EA1, the second light emitting area EA2, and the third light emitting area EA3 is an area where the pixel electrode 171, the light emitting layer 172, and the common electrode 173 are sequentially stacked, and holes from the pixel electrode 171 are combined with electrons from the common electrode 173 at the light emitting layer 172 to emit light. The first light emitting area EA1 may emit light of a first color, the second light emitting area EA2 may emit light of a second color, and the third light emitting area EA3 may emit light of a third color. Each of the first, second and third light emitting areas EA1, EA2 and EA3 may emit, for example, red, green, blue, or white light.

The light emitting layer 172 is formed on the pixel electrode 171 and the bank 190, and may include an organic material to emit light of a predetermined color. In an embodiment of the present inventive concept, the light emitting layer 172 may include a fluorescent material or a phosphorescent material. For example, the light emitting layer 172 may include a hole transport layer, an organic material layer, and an electron transport layer. Further, the light emitting layer 172 may also include a hole injection layer and an electron injection layer.

The common electrode 173 is formed on the light emitting layer 172, and may be formed to cover the light emitting layer 172. The common electrode 173 may be a common layer formed in common in the first light emitting area EA1, the second light emitting area EA2, and the third light emitting area EA3. A capping layer may be formed on the common electrode 173.

In the top emission structure, the common electrode 173 may include a transparent conductive material (TCO) such as, for example, indium tin oxide (ITO), zinc oxide (ZnO), indium oxide ($In_2O_3$) or indium zinc oxide (IZO), which can transmit light, or a semi-transmissive conductive material such as magnesium (Mg), silver (Ag) or an alloy of magnesium (Mg) and silver (Ag). When the common electrode 173 includes a semi-transmissive conductive material, light emission efficiency may be increased by microcavities.

An encapsulation layer TFE may be formed on the common electrode 173, and may include at least one inorganic film to prevent the penetration of oxygen or moisture into the light emitting element layer EML. Further, the encapsulation layer TFE may include at least one organic layer to protect the light emitting element layer EML from foreign matter such as dust. For example, the encapsulation layer TFE includes a first encapsulation inorganic layer TFE1, an encapsulation organic layer TFE2, and a second encapsulation inorganic layer TFE3.

The first encapsulation inorganic layer TFE1 may be disposed on the common electrode 173, the encapsulation organic layer TFE2 may be disposed on the first encapsulation inorganic layer TFE1, and the second encapsulation inorganic layer TFE3 may be disposed on the encapsulation organic layer TFE2. In an embodiment of the present inventive concept, the number of encapsulation organic layers and the number of encapsulation inorganic layers and an order of stacking encapsulation organic layers and encapsulation inorganic layers may be variously changed. Each of the first encapsulation inorganic layer TFE1 and the second encapsulation inorganic layer TFE3 may be formed as multiple layers in which one or more inorganic layers of, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, and an aluminum oxide ($Al_2O_3$) layer are alternately stacked. The encapsulation organic layer TFE2 may be formed of an organic material including, for example, an acrylic resin, an epoxy resin, a phenolic resin, a polyamide resin, or a polyimide resin. The encapsulation organic layer TFE2 may provide a flat surface on the first encapsulation inorganic layer TFE1, and may relieve the stress between the contacting layers.

The touch sensing layer SENL may be disposed on the encapsulation layer TFEL, and may be driven in a mutual capacitance method in which a voltage charged in mutual capacitance is sensed through sensing electrodes RE after applying driving signals to driving electrodes TE. Since the first display panel 110 includes the touch sensing layer SENL, the display device 10 may detect a touch event in which a user touches the first display panel 110.

The touch sensing layer SENL includes a second buffer layer BF2, a connection electrode BE1, a first touch insulating layer TIS1, a driving electrode TE, a sensing electrode RE, and a second touch insulating layer TINS2.

The second buffer layer BF2 may be formed of an inorganic layer, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The connection electrode BE1 may be disposed on the second buffer layer BF2. The connection electrode BE1 may be formed of, for example, a laminated structure (Ti/Al/Ti) of aluminum (Al) and titanium (Ti), a laminated structure (ITO/Al/ITO) of aluminum (Al) and ITO, a laminated structure (ITO/Ag/ITO) of silver (Ag) and ITO, an APC alloy, and a laminated structure (ITO/APC/ITO) of APC alloy and ITO.

The first touch insulating layer TINS1 is disposed on the connection electrode BE1. The first touch insulating layer TINS1 may be formed of an inorganic layer, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer. Alternatively, the first touch insulating layer TINS1 may be formed of an organic layer including, for example, an acrylic resin, an epoxy resin, a phenolic resin, a polyamide resin, or a polyimide resin.

The driving electrode TE and the sensing electrode RE may be disposed on the first touch insulating layer TINS1. In addition to the driving electrode TE and the sensing electrode RE, dummy patterns, first driving lines, second driving lines, and sensing lines, may be arranged on the first touch insulating layer TINS1.

The driving electrode TE and the sensing electrode RE may overlap the connection electrode BE1 in the third direction (Z-axis direction). The driving electrode TE may be connected to the connection electrode BE1 through a touch contact hole TCNT1 penetrating the first touch insulating layer TINS1. Therefore, due to the connection electrodes BE1, the driving electrodes TE and the sensing electrodes RE may be electrically separated at their intersections, and mutual capacitance may be formed between the driving electrodes TE and the sensing electrodes RE. Each of the driving electrode TE and the sensing electrode RE may be formed of, for example, a laminated structure (Ti/Al/Ti) of aluminum (Al) and titanium (Ti), a laminated structure (ITO/Al/ITO) of aluminum (Al) and ITO, a laminated structure (ITO/Ag/ITO) of silver (Ag) and ITO, an APC alloy, and a laminated structure (ITO/APC/ITO) of APC alloy and ITO. In an embodiment of the present inventive concept, to prevent the driving electrodes TE and the sensing electrodes RE including a metal layer from being viewed by a user, the driving electrodes TE and the sensing electrodes RE including the metal layer may have a mesh shape.

The second touch insulating layer TINS2 is formed on the driving electrode TE and the sensing electrode RE, and may flatten a step formed by the driving electrode TE, the sensing electrode RE, and the connection electrode BE1. The second touch insulating layer TINS2 may be formed of an organic layer including, for example, an acrylic resin, an epoxy resin, a phenolic resin, a polyamide resin, or a polyimide resin.

Since the second display area DA2 of the second display panel 120 may be substantially the same as the first display area DA1 of the first display panel 110, a description of the second display area DA2 of the second display panel 120 will be omitted.

Figure 6:
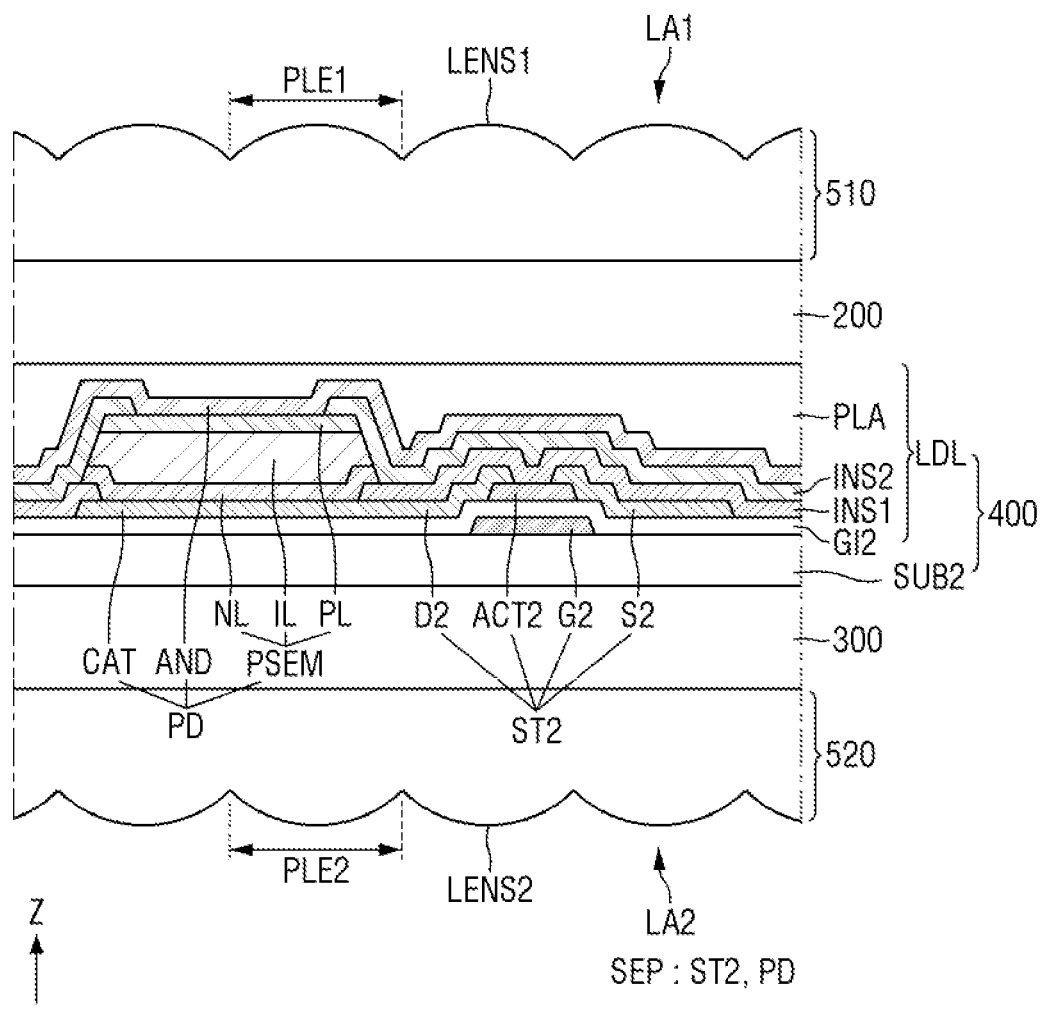
FIG. 6 is a cross-sectional view illustrating an example of the first light transmission control unit, the second light transmission control unit, and the fingerprint sensor of FIGS. 3 and 4.

FIG. 6 is a cross-sectional view illustrating an example of the first light transmission control unit, the second light transmission control unit, and the fingerprint sensor of FIGS. 3 and 4.

Referring to FIG. 6, the fingerprint sensor 400 may be an optical fingerprint sensor including a second substrate SUB2 and a light sensing layer LDL. The light sensing layer LDL includes sensor pixels SEP that sense light. Each of the sensor pixels SEP includes a second transistor ST2, a light sensing element PD, a second gate insulating layer GI2, a first insulating layer INS1, a second insulating layer INS2, and a planarization layer PLA.

The second substrate SUB2 may be made of an insulating material such as glass or polymer resin. For example, when the second substrate SUB2 is a flexible substrate capable of bending, folding, or rolling, it may be made of polyimide.

The second transistor ST2 may be disposed on the second substrate SUB2, and may include a second active layer ACT2, a second gate electrode G2, a second source electrode S2, and a second drain electrode D2.

The second gate electrode G2 of the second transistor ST2 may be disposed on the second substrate SUB2. The second gate electrode G2 may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof.

The second gate insulating layer GI2 may be disposed on the second gate electrode G2. The second gate insulating layer GI2 may be formed of an inorganic layer such as, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The second active layer ACT2 of the second transistor ST2 may be disposed on the second gate insulating layer GI2. The second active layer ACT2 includes polycrystalline silicon (p-Si), monocrystalline silicon (Si), low-temperature polycrystalline silicon (p-Si), amorphous silicon (a-Si:H), or an oxide semiconductor. In an embodiment of the present inventive concept, the second active layer ACT2 of the second transistor ST2 may include an oxide of at least one material selected from, for example, indium (In), gallium (Ga), stannum (Sn), zirconium (Zr), vanadium (V), hafnium (Hf), cadmium (Cd), germanium (Ge), chromium (Cr), titanium (Ti), and zinc (Zn). The second active layer ACT2 may overlap the second gate electrode G2 in the third direction (Z-axis direction) that is a thickness direction of the second substrate SUB2.

The second source electrode S2 and the second drain electrode D2 of the second transistor ST2 may be disposed on the second active layer ACT2. The second source electrode S2 may be disposed on one side of the second active layer ACT2, and the second drain electrode D2 may be disposed on the other side of the second active layer ACT2.

The first insulating layer INS1 may be disposed on the second active layer ACT2, the second source electrode S2, and the second drain electrode D2. The first insulating layer INS1 may be formed of an inorganic layer, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The light sensing element PD may be disposed on the second gate insulating layer GI2. The light sensing element PD may be a photodiode as shown in FIG. 6, but the present inventive concept is not limited thereto. For example, the light sensing element PD may be formed as a photo transistor. When the light sensing element PD is a photodiode, it may include a cathode electrode CAT, a semiconductor layer PSEM, and an anode electrode AND.

The cathode electrode CAT may be disposed on the second gate insulating layer GI2. The cathode electrode CAT may be formed of a transparent conductive material such as, for example, indium tin oxide (ITO), zinc oxide (ZnO), indium oxide ($In_2O_3$) or indium zinc oxide (IZO), which can transmit light.

The semiconductor layer PSEM in which an N-type semiconductor layer NL, an I-type semiconductor layer IL, and a P-type semiconductor layer PL are sequentially stacked may be disposed on the cathode electrode CAT. In this case, the photodiode is a PIN photodiode. When the semiconductor layer PSEM is formed in a PIN structure, the I-type semiconductor layer (IL) is depleted by the P-type semiconductor layer (PL) and the N-type semiconductor layer (NL) to generate an electric field therein, and holes and electrons generated by sunlight are drifted by the electric field. Accordingly, holes may be collected to the anode electrode AND through the P-type semiconductor layer PL, and electrons may be collected to the cathode electrode CAT through the N-type semiconductor layer NL. For example, holes move to anode electrode AND and electrons move to cathode electrode CAT to produce photo current.

The N-type semiconductor layer NL may be disposed on the cathode electrode CAT, the I-type semiconductor layer IL may be disposed on the N-type semiconductor layer NL, and the P-type semiconductor layer PL may be disposed on the I-type semiconductor layer IL.

For example, I-type semiconductor layer IL may be interposed between the N-type semiconductor layer NL and the P-type semiconductor layer PL. In this case, the P-type semiconductor layer PL may be formed by doping amorphous silicon (a-Si:H) with a P-type dopant. The I-type semiconductor layer IL may be formed of amorphous silicon germanium (a-SiGe:H) or amorphous silicon carbide (a-SiC:H). The N-type semiconductor layer NL may be formed by doping amorphous silicon germanium (a-SiGe:H) or amorphous silicon carbide (a-SiC:H) with an N-type dopant. Each of the P-type semiconductor layer PL and the N-type semiconductor layer NL may be formed to have a thickness of about 500 Å, and the I-type semiconductor layer IL may be formed to have a thickness of about 5,000 Å to about 10,000 Å.

Instead of the PIN photodiode described above, the N-type semiconductor layer NL may be disposed on the cathode electrode CAT, the I-type semiconductor layer IL may be omitted, and the P-type semiconductor layer PL may be disposed on the N-type semiconductor layer NL. In this case, the photodiode is a PN junction photodiode, and the P-type semiconductor layer PL may be formed by doping amorphous silicon (a-Si:H) with a P-type dopant. The N-type semiconductor layer NL may be formed by doping amorphous silicon germanium (a-SiGe:H) or amorphous silicon carbide (a-SiC:H) with an N-type dopant. Each of the P-type semiconductor layer PL and the N-type semiconductor layer NL may be formed to have a thickness of about 500 Å.

The upper or lower surface of at least one of the cathode electrode (CAT), the P-type semiconductor layer (PL), the I-type semiconductor layer (IL), or the N-type semiconductor layer (NL) may be formed to have an uneven structure through a texturing process to increase the absorption rate of external light. The texturing process is a process of forming the surface of a material into an uneven structure, that is, a process of processing the surface of the material in the same shape as the surface of a fabric. The texturing process may be performed through an etching process using photolithography, an anisotropic wet etching process using a chemical solution, or a groove formation process using mechanical scribing.

The anode electrode AND may be disposed on the P-type semiconductor layer PL. The anode electrode AND may be formed of a transparent conductive material such as, for example, indium tin oxide (ITO), zinc oxide (ZnO), indium oxide ($In_2O_3$) or indium zinc oxide (IZO), which can transmit light. The anode electrode AND may be a common layer commonly formed in the light sensing layer LDL.

The planarization layer PLA may be disposed on the anode electrode AND. The planarization layer PLA may be formed of an organic layer including, for example, an acrylic resin, an epoxy resin, a phenolic resin, a polyamide resin, or a polyimide resin.

The first light transmission control unit 200 may be disposed on the planarization layer PLA. The second light transmission control unit 300 may be disposed under the second substrate SUB2. The first light transmission control unit 200 and the second light transmission control unit 300 will be described later with reference to FIGS. 7 and 8.

The first light guide unit 510 may be disposed on the first light transmission control unit 200, and may be disposed between the first light transmission control unit 200 and the first display panel 110. The first light guide unit 510 may provide or guide light to each of the sensor pixels SEP, for example, to the light sensing element PD of the fingerprint sensor 400. It is illustrated in FIG. 6 that the first light guide unit 510 includes a first lens array LA1 having a plurality of first lenses LENS1.

Each of the first lenses LENS1 may be a convex lens that is convex upward. The first lenses LENS1 may form an upper surface of the first light guide unit 510. The first lens array LA1 may be formed of a polymer resin or plastic capable of transmitting light.

The second light guide unit 520 may be disposed under the second light transmission control unit 300, and may be disposed between the second light transmission control unit 300 and the second display panel 120. The second light guide unit 520 may provide or guide light to each of the sensor pixels SEP, for example, to the light sensing element PD of the fingerprint sensor 400. It is illustrated in FIG. 6 that the second light guide unit 520 includes a second lens array LA2 having a plurality of second lenses LENS2.

Each of the second lenses LENS2 may be a convex lens that is convex downward. The second lenses LENS2 may form an lower surface of the second light guide unit 520 under the second light transmission control unit 300. The second lens array LA2 may be formed of a polymer resin or plastic which is capable of transmitting light.

The minimum distance between the first lens LENS1 and the light sensing element PD may be different from the minimum distance between the second lens LENS2 and the light sensing element PD. Thus, the refractive index of the first lens LENS1 may be different from the refractive index of the second lens LENS2. Further, the pitch PLE1 of the first lens LENS1 may be different from the pitch PLE2 of the second lens LENS2. For example, when the minimum distance between the first lens LENS1 and the light sensing element PD is shorter than the minimum distance between the second lens LENS2 and the light sensing element PD, the refractive index of the first lens LENS1 may be smaller than the refractive index of the second lens LENS2. Further, the pitch PLE1 of the first lens LENS1 may be smaller than the pitch PLE2 of the second lens LENS2. Alternatively, in an embodiment of the present inventive concept, the pitch PLE1 of the first lens LENS1 may be about the same as the pitch PLE2 of the second lens LENS2.

Transparent adhesive members may be disposed between the light sensing layer LDL of the fingerprint sensor 400 and the first light transmission control unit 200, between the first light transmission control unit 200 and the first light guide unit 510, and between the first light guide unit 510 and the first display panel 110. For example, the first light guide unit 510 may be disposed on first light transmission control unit 200, with a transparent adhesive member interposed therebetween to bond the first light guide unit 510 to the first light transmission control unit 200. In addition, transparent adhesive members may be disposed between the second substrate SUB2 of the fingerprint sensor 400 and the second light transmission control unit 300, between the second light transmission control unit 300 and the second light guide unit 520, and between the second light guide unit 520 and the second display panel 120. The transparent adhesive member may be a transparent adhesive resin such as an optically clear resin (OCR) or a transparent adhesive film such as an optically clear adhesive (OCA) film. For example, the transparent adhesive member may be a transparent adhesive film such as a pressure sensitive adhesive (PSA) film. As shown in FIG. 6, since both the cathode electrode CAT and the anode electrode AND of the light sensing element PD are formed of a transparent conductive material, the light sensing element PD may detect both light incident from the upper portion of the light sensing layer LDL and light incident from the lower portion of the light sensing layer LDL.

The first light transmission control unit 200 is disposed on the fingerprint sensor 400, and the second light transmission control unit 300 is disposed under the fingerprint sensor 400. Therefore, in the display device 10, the first light transmission control unit 200 and the second light transmission control unit 300 may each be used to control only one of light incident on the light sensing element PD from the top of the light sensing element PD and light incident on the light sensing element PD from the bottom of the light sensing element PD.

Figure 14:
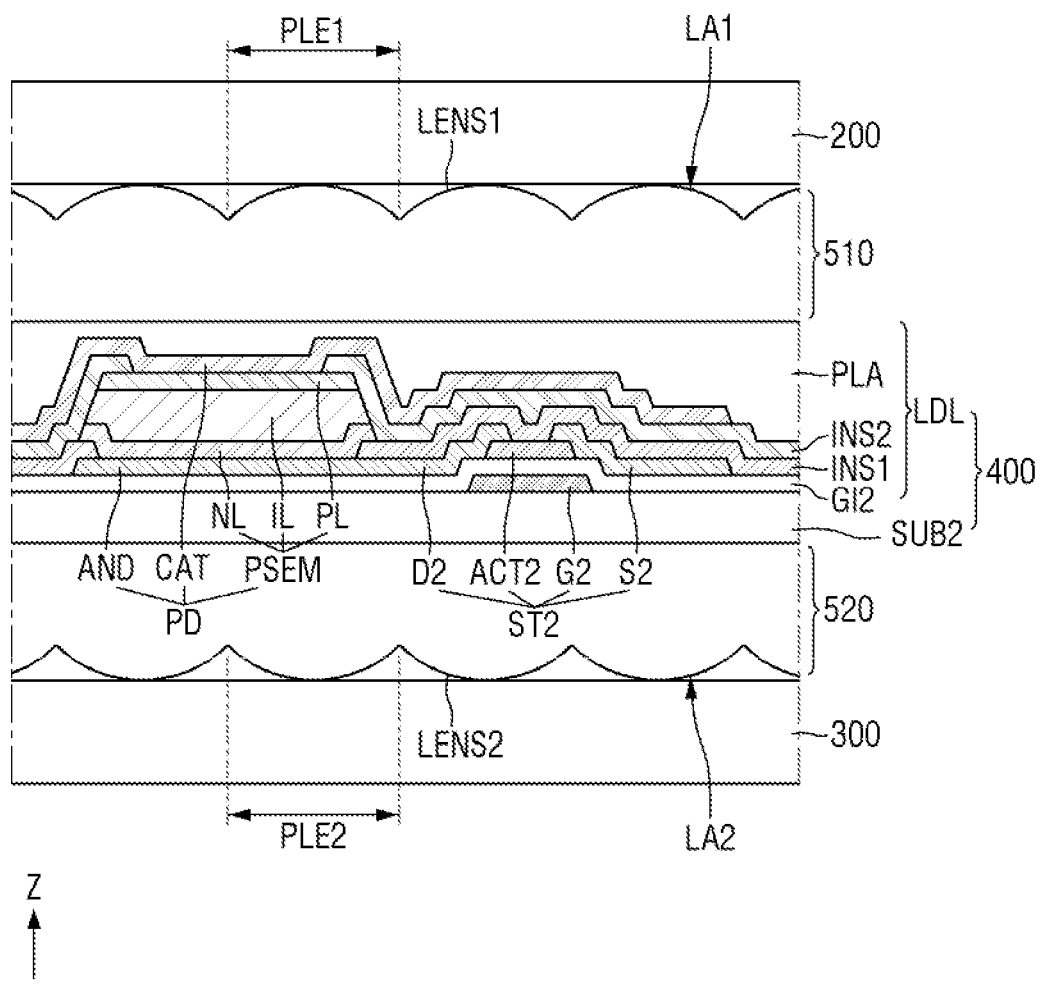
FIG. 14 is a cross-sectional view illustrating another example of the first light transmission control unit, the second light transmission control unit, and the fingerprint sensor of FIGS. 3 and 4.

Although it is illustrated in FIG. 6 that the first light transmission control unit 200 is disposed between the first light guide unit 510 and the fingerprint sensor 400 and the second light transmission control unit 300 is disposed between the second light guide unit 520 and the fingerprint sensor 400, the present inventive concept is not limited thereto. For example, as shown in FIG. 14 and will be further described later, as the first light transmission control unit 200 is disposed on the upper surface of the first light guide unit 510, the first light guide unit 510 may be disposed between the first light transmission control unit 200 and the fingerprint sensor 400. Further, as the second light transmission control unit 300 is disposed on the lower surface of the second light guide unit 520, the second light guide unit 520 may be disposed between the second light transmission control unit 300 and the fingerprint sensor 400.

Light transmission filters that transmit or reflect light of a long wavelength such as infrared light and transmit visible light may be disposed between the first light transmission control unit 200 and the fingerprint sensor 400 and between the second light transmission control unit 300 and the fingerprint sensor 400. Alternatively, light transmission filters may be disposed between the first light transmission control unit 200 and the first light guide unit 510 and between the second light transmission control unit 300 and the second light guide unit 520. Since light of a long wavelength such as infrared light is not reflected from a finger, it may be noise light. Therefore, the light transmission filter may be used to prevent or reduce the light of a long wavelength such as infrared light from being incident on the light sensing element PD. By reducing the noise light, the performance of the light sensing element PD may be enhanced.

Figure 7:
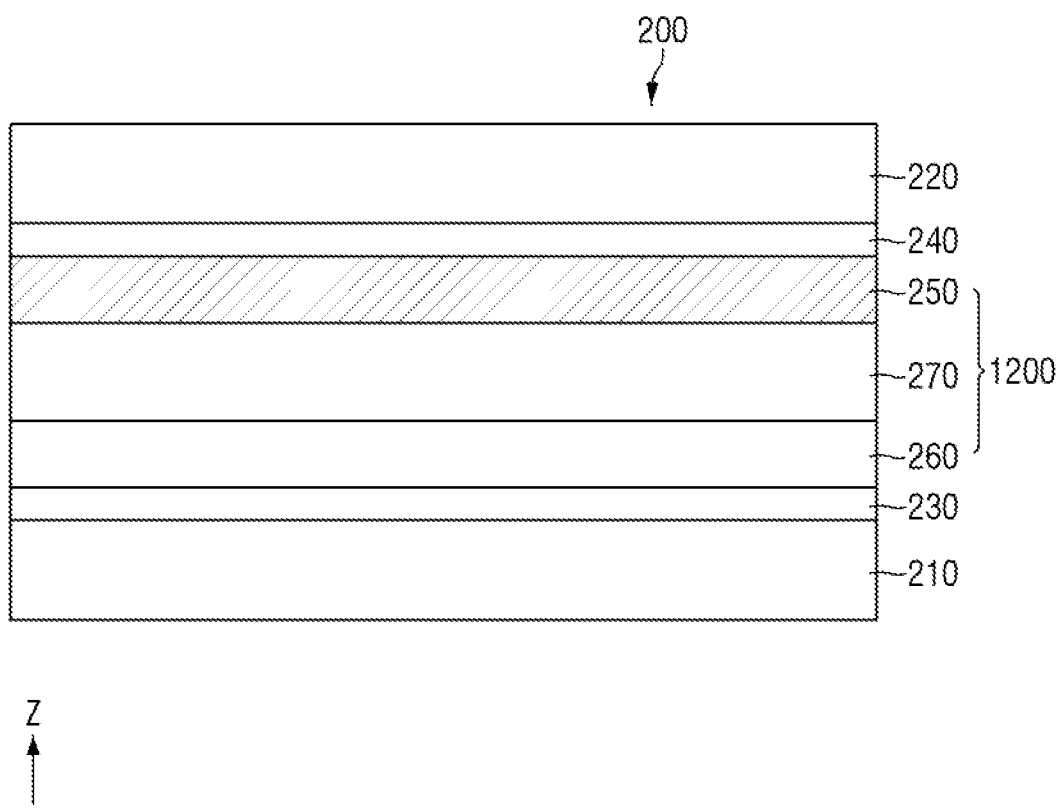
FIG. 7 is a cross-sectional view illustrating an example of the first light transmission control unit of FIG. 6.

FIG. 7 is a cross-sectional view illustrating an example of the first light transmission control unit 200 of FIG. 6.

Referring to FIG. 7, the first light transmission control unit 200 may transmit most of the incident light in the light transmission mode and may block most of the incident light in the light blocking mode. For example, the light transmittance of the first light transmission control unit 200 in the light transmission mode may be about 60% or more, and the light transmittance of the first light transmission control unit 200 in the light blocking mode may be about 40% or less.

The first light transmission control unit 200 includes a first base substrate 210, a second base substrate 220, a first electrode 230, a second electrode 240, and a light transmission control layer 1200. The light transmission control layer 1200 includes an electrochromic layer 250, a counter layer 260, and an electrolyte layer 270.

Each of the first and second base substrates 210 and 220 may be made of glass or plastic.

The first electrode 230 is disposed on one surface of the first base substrate 210 facing the second base substrate 220. The second electrode 240 is disposed on one surface of the second base substrate 220 facing the first base substrate 210, and thus, is located between the second base substrate 220 and the first electrode 230. Each of the first electrode 230 and the second electrode 240 may be formed of a transparent conductive material such as, for example, indium tin oxide (ITO), zinc oxide (ZnO), indium oxide ($In_2O_3$), or indium zinc oxide (IZO), which can transmit light.

The counter layer 260 may be disposed on the first electrode 230, the electrolyte layer 270 may be disposed on the counter layer 260, and the electrochromic layer 250 may be disposed on the electrolyte layer 270. For example, the electrochromic layer 250 may be disposed on one surface of the second electrode 240 facing the first electrode 230, the counter layer 260 may be disposed on one surface of the first electrode 230 facing the second electrode 240 and located between the first electrode 230 and the electrochromic layer 250, and the electrolyte layer 270 may be disposed between the electrochromic layer 250 and the counter layer 260.

In the electrochromic layer 250, the counter layer 260, and the electrolyte layer 270, when a voltage is applied to the first electrode 230 and the second electrode 240, an electrochemical oxidation-reduction reaction occurs, and thus the color of the electrochromic layer 250 may change.

When the first driving voltage applied to the first electrode 230 is a positive voltage and the second driving voltage applied to the second electrode 240 is a negative voltage, a reduction reaction occurs in the electrochromic layer 250, and an oxidation reaction occurs in the counter layer 260. Since the electrochromic layer 250 is disposed on the second electrode 240, the negative voltage applied to the second electrode 240 is applied to the electrochromic layer 250. The negative voltage may be a voltage less than 0 V, and the positive voltage may be a voltage more than 0 V. In this case, since the electrochromic layer 250 has a predetermined color such as black by a reduction reaction, most of the incident light may be blocked. Therefore, the first light transmission control unit 200 may implement a light blocking mode for blocking light.

When the first driving voltage applied to the first electrode 230 is a negative voltage and the second driving voltage applied to the second electrode 240 is a positive voltage, an oxidation reaction occurs in the electrochromic layer 250, and a reduction reaction occurs in the counter layer 260. In this case, since the electrochromic layer 250 becomes transparent due to an oxidation reaction, most of the incident light may be transmitted. Therefore, the first light transmission control unit 200 may implement a light transmission mode for transmitting light.

The electrochromic layer 250 includes an electrochromic material. When a reduction reaction occurs, the electrochromic material absorbs a predetermined color to have a predetermined color, and when an oxidation reaction occurs, the electrochromic material becomes transparent. For example, the electrochromic material may be viologen (1,1'-dibenzyl-4,4'-bipyridinium bis(tetrafluoroborate)). To enhance the light blocking function of the electrochromic layer 250, the electrochromic layer 250 may include electrochromic materials that have various colors through a reduction reaction. For example, in addition to the viologen compounds, terephthalic acid compounds and pyridine compounds may also be used to form the electrochromic layer 250 for color developing or erasing at a relatively lower voltage and exhibit good color value.

The counter layer 260 corresponds to a layer that assists the electrochromic layer 250 to facilitate an oxidation-reduction reaction. The counter layer 260 includes a counter material that has a predetermined color by absorbing a predetermined color when an oxidation reaction occurs and becomes transparent by a reduction reaction. The counter material may be, for example, TMPD (N,N,N',N'-tetramethyl-1,4-phenylenediamine), TMB (3,3',5,5'-tetramethylbenzidine), NTMB (N,N,N',N'-tetramethylbenzidine), or DAB (3,3'-diaminobenzidine). The counter layer 260 may be omitted.

The electrolyte layer 270 may include an electrolyte, a polymer, and a UV initiator. The electrolyte may be lithium perchlorate, t-butylammonium perchlorate, t-butylammonium-t-fluoroborate, or tetrabutylammonium trifluoromethanesulfonate. The polymer may be an acrylate-based polymer, a polyester-based polymer, or an epoxy-based polymer. The UV initiator may be benzoin ethers or amines. The electrolyte layer 270 may be formed by UV curing after being applied in a viscous liquid state. In an embodiment of the present inventive concept, the viscous liquid may include polymerizable monomers or oligomers, and the polymerizable monomers or oligomers may be polymerized through UV curing. The electrolyte layer 270 provides cations and anions such that the electrochromic layer 250 and the counter layer 260 perform an oxidation-reduction reaction.

As shown in FIG. 7, since the first light transmission control unit 200 includes the electrochromic layer 250, the first light transmission control unit 200 may have a predetermined color or a transparent color by an oxidation-reduction reaction according to the first driving voltage applied to the first electrode 230 and the second driving voltage applied to the second electrode 240. Therefore, the first light transmission control unit 200 may be implemented in a light blocking mode in which most of the incident light is blocked and a light transmission mode in which most of the incident light is transmitted.

The second light transmission control unit 300 may be similar to the first light transmission control unit 200. Since the second light transmission control unit 300 may be substantially the same as that described with reference to FIG. 7, a description of the second light transmission control unit 300 will be omitted.

Figure 8:
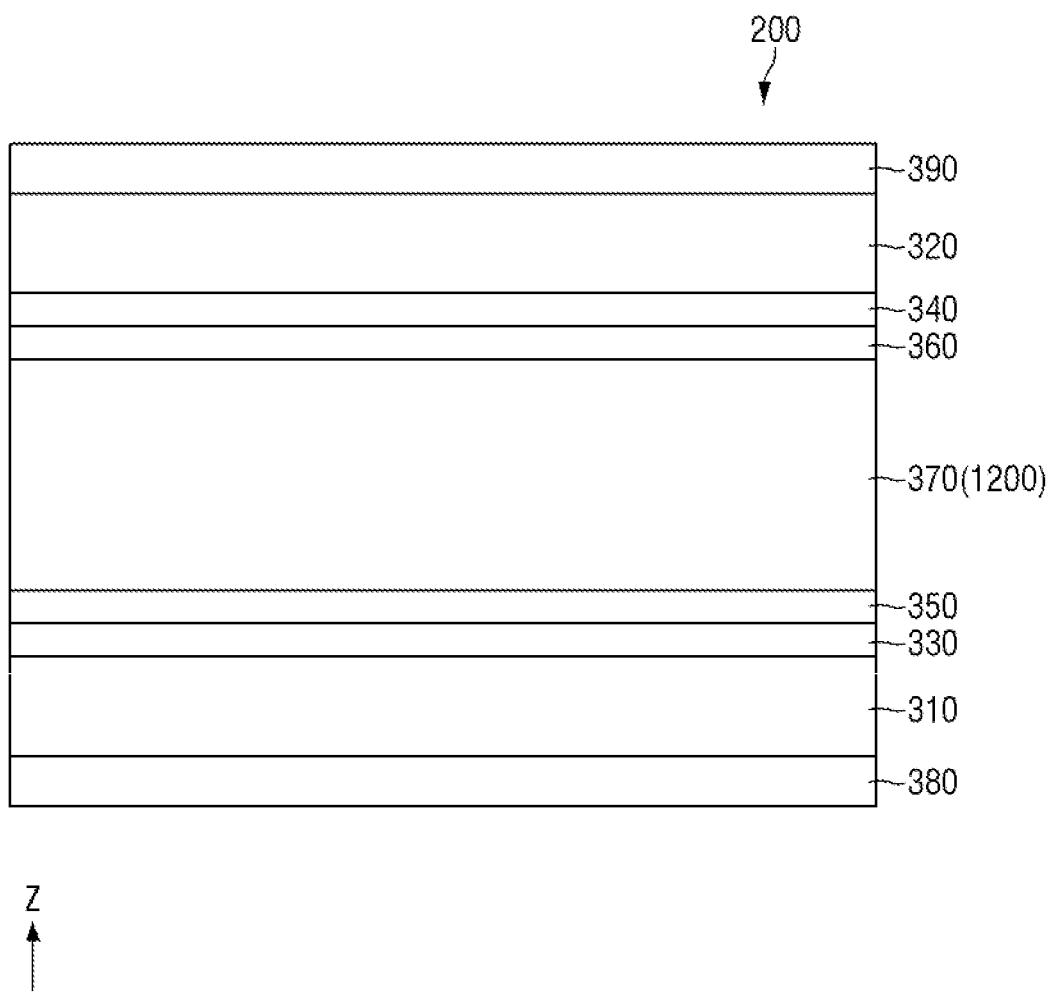
FIG. 8 is a cross-sectional view illustrating another example of the first light transmission control unit of FIG. 6.

FIG. 8 is a cross-sectional view illustrating another example of the first light transmission control unit of FIG. 6.

Referring to FIG. 8, the first light transmission control unit 200 includes a first base substrate 310, a second base substrate 320, a first electrode 330, a second electrode 340, a first alignment layer 350, a second alignment layer 360, a light transmission control layer 1200, a first polarizing plate 380, and a second polarizing plate 390. The light transmission control layer 1200 may be a liquid crystal layer 370.

The first base substrate 310, the second base substrate 320, the first electrode 330, and the second electrode 340, illustrated in FIG. 8, may be substantially the same as the first base substrate 210, the second base substrate 220, the first electrode 230, and the second electrode 240, having been described with reference to FIG. 7. Therefore, descriptions of the first base substrate 310, the second base substrate 320, the first electrode 330, and the second electrode 340, illustrated in FIG. 8, will be omitted.

The first alignment layer 350 may be disposed on one surface of the first electrode 330 facing the second base substrate 320. The second alignment layer 360 may be disposed on one surface of the second electrode 340 facing the first base substrate 310, and thus, may be located between the second electrode 340 and the first alignment layer 350.

The liquid crystal layer 370 may include liquid crystals. Although it is mainly described with reference to FIG. 8 that the liquid crystal layer 370 includes twisted nematic (TN) liquid crystals which may have low voltage requirements and may operate over a large wavelength range, the present inventive concept is not limited thereto. The twisted nematic (TN) liquid crystals are basically 90° liquid crystal polarization rotators.

The liquid crystals of the liquid crystal layer 370 are pre-tilted by the first alignment layer 350 and the second alignment layer 360. When an electric field is not applied to the liquid crystal layer 370 by the first electrode 330 and the second electrode 340, the liquid crystals of the liquid crystal layer 370 may be arranged to rotate first polarized light by 90° to convert the first polarized light into second polarized light. The case where an electric field is not applied to the liquid crystal layer 370 by the first electrode 330 and the second electrode 340 includes not only a case where the voltage difference between the first driving voltage applied to the first electrode 330 and the second driving voltage applied to the second electrode 340 is less than the threshold voltage but also a case where the first driving voltage is not applied to the first electrode 330 and the second driving voltage is not applied to the second electrode 340. Therefore, when a voltage is not applied to the first electrode 330 and the second electrode 340, the first light transmission control unit 200 may operate in a light transmission mode in which most of the incident light is transmitted, and thus the light transmission mode can be implemented without power consumption. For example, this may be a normally white mode, which has maximum transmission with zero voltage applied, with the first polarizing plate 380 and the second polarizing plate 390 orthogonally mounted in the first light transmission control unit 200. The light may then be attenuated as voltage increases. This mode achieves higher contrast by using the crossed polarizer configuration.

When an electric field is applied to the liquid crystal layer 370 by the first electrode 330 and the second electrode 340, the liquid crystals of the liquid crystal layer 370 may be arranged to pass the first polarized light as it is. The case where an electric field is applied to the liquid crystal layer 370 by the first electrode 330 and the second electrode 340 refers to a case where the voltage difference between the first driving voltage applied to the first electrode 330 and the second driving voltage applied to the second electrode 340 is more than the threshold voltage.

The first polarizing plate 380 may be disposed on the other surface of the first base substrate 310, and the second polarizing plate 390 may be disposed on the other surface of the second base substrate 320. The other surface of the first base substrate 310 may be a surface opposite to one surface of the first base substrate 310, and may be a surface not facing the second base substrate 320. The other surface of the second base substrate 320 may be a surface opposite to one surface of the second base substrate 320, and may be a surface not facing the first base substrate 310.

The first polarizing plate 380 may have a first light transmission axis through which the first polarized light is transmitted, and the second polarizing plate 390 may have a second light transmission axis through which the second polarized light is transmitted. The first light transmission axis and the second light transmission axis may be orthogonal to each other.

As shown in FIG. 8, the first light transmission control unit 200 may include the liquid crystal layer 370 to control the polarization of incident light according to the first driving voltage applied to the first electrode 230 and the second driving voltage applied to the second electrode 240. For example, when an electric field is not applied to the liquid crystal layer 370 by the first electrode 330 and the second electrode 340, the liquid crystals in the liquid crystal layer 370 are arranged to rotate the first polarized light by 90° to convert the first polarized light into the second polarized light, and thus the light passing through the liquid crystal layer 370 may pass through the second polarizing plate 390. The 90° rotated first polarization light may pass through the second polarizing plate 390, because the first polarizing plate 380 and the second polarizing plate 390 are orthogonally mounted in the first light transmission control unit 200. That is, when an electric field is not applied to the liquid crystal layer 370 by the first electrode 330 and the second electrode 340, the first light transmission control unit 200 may be implemented in a light transmission mode in which most of the incident light is transmitted. Further, when an electric field is applied to the liquid crystal layer 370 by the first electrode 330 and the second electrode 340, the liquid crystals in the liquid crystal layer 370 are arranged to pass the first polarized light as it is, and thus the light passing through the liquid crystal layer 370 cannot pass through the second polarizing plate 390. The first polarized light as it is may not pass through the second polarizing plate 390, because the first polarizing plate 380 and the second polarizing plate 390 are orthogonally mounted in the first light transmission control unit 200. That is, when an electric field is applied to the liquid crystal layer 370 by the first electrode 330 and the second electrode 340, the first light transmission control unit 200 may be implemented in a light blocking mode in which most of the incident light is blocked.

The second light transmission control unit 300 may be similar to the first light transmission control unit 200. Since the second light transmission control unit 300 may be substantially the same as that described with reference to FIG. 8, a description of the second light transmission control unit 300 will be omitted.

Although it is illustrated in FIGS. 7 and 8 that each of the first light transmission control unit 200 and the second light transmission control unit 300 includes the electrochromic layer 250 or the liquid crystal layer 370 to control light transmission, the present inventive concept is not limited thereto. For example, in addition to the electrochromic layer 250 and the liquid crystal layer 370, it should be considered that if the configuration can control light transmission according to the applied driving voltages, it may be applied to the first light transmission control unit 200.

Figure 9:
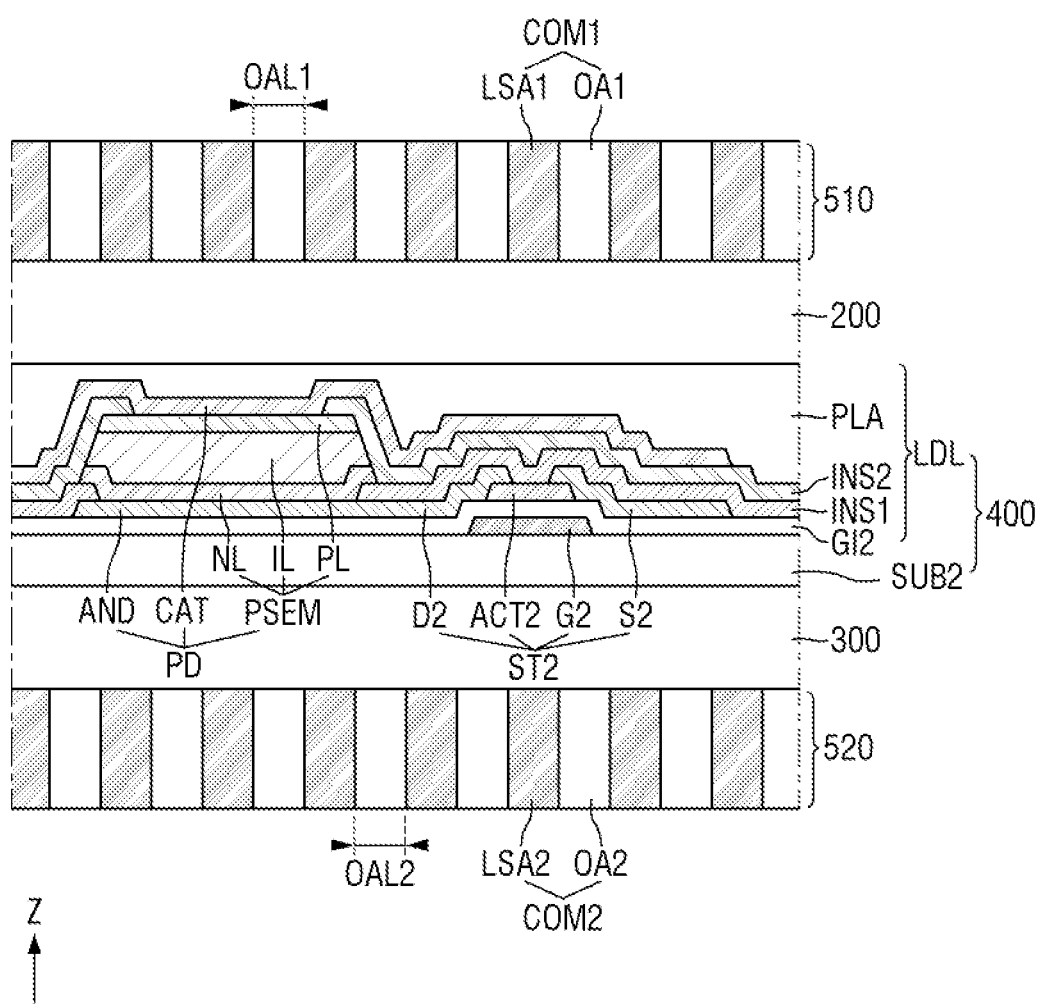
FIG. 9 is a cross-sectional view illustrating another example of the first light transmission control unit, the second light transmission control unit, and the fingerprint sensor of FIGS. 3 and 4.

FIG. 9 is a cross-sectional view illustrating another example of the first light transmission control unit, the second light transmission control unit, and the fingerprint sensor of FIGS. 3 and 4.

The embodiment of FIG. 9 is different from the embodiment of FIG. 6 in that the first light guide unit 510 includes a first collimator COM1 instead of the first lens array LA1, and the second light guide unit 520 includes a second collimator COM2 instead of the second lens array LA2. In FIG. 9, a description will be made mainly on differences from the embodiment of FIG. 6.

Referring to FIG. 9, the first collimator COM1 may include first light transmitting portions OA1 that transmit light and a first light blocking portion LSA1 that blocks light. The first light transmitting portions OA1 and the first light blocking portion LSA1 may be disposed on the first light transmission control unit 200. The first light blocking portion LSA1 may be disposed to surround each of the first light transmitting portions OA1, and may be disposed between the first light transmitting portions OA1 in one direction which may be a direction perpendicular to the third direction (Z-axis direction). For example, the first light transmitting portions OA1 and portions of the first light blocking portion LSA1 may be alternately arranged in the one direction.

The first light transmitting portions OA1 may be paths through which light reflected from the fingerprint of the finger F passes, and may be formed of a transparent organic layer including, for example, an acrylic resin, an epoxy resin, a phenolic resin, a polyamide resin, or a polyimide resin. Thus, the first collimator COM1 may change a diverging light or other radiation into a parallel beam.

The first light blocking portion LSA1 may be formed of a photosensitive resin capable of blocking light. For example, the first light blocking part LSA1 may include an inorganic black pigment such as carbon black or an organic black pigment.

The second collimator COM2 may include second light transmitting portions OA2 that transmit light and a second light blocking portion LSA2 that blocks light. The second light transmitting portions OA2 and the second light blocking portion LSA2 may be disposed on the second light transmission control unit 300. The second light blocking portion LSA2 may be disposed to surround each of the second light transmitting portions OA2, and may be disposed between the second light transmitting portions OA2 in one direction which may be a direction perpendicular to the third direction (Z-axis direction). For example, the second light transmitting portions OA2 and portions of the second light blocking portion LSA1 may be alternately arranged in the one direction.

The second light transmitting portions OA2 may be paths through which light reflected from the fingerprint of the finger F passes, and may be formed of a transparent organic layer including, for example, an acrylic resin, an epoxy resin, a phenolic resin, a polyamide resin, or a polyimide resin. Thus, the second collimator COM2 may change a diverging light or other radiation into a parallel beam.

The second light blocking portion LSA2 may be formed of a photosensitive resin capable of blocking light. For example, the second light blocking part LSA2 may include an inorganic black pigment such as carbon black or an organic black pigment.

The minimum distance between the first light guide unit 510 and the light sensing element PD may be different from the minimum distance between the second light guide unit 520 and the light sensing element PD. Thus, the length OAL1 of the first light transmitting portion OA1 in one direction may be different from the length OAL2 of the second light transmitting portion OA2 in the one direction. For example, when the minimum distance between the first light guide unit 510 and the light sensing element PD is shorter than the minimum distance between the second light guide unit 520 and the light sensing element PD, the length OAL1 of the first light transmitting portion OA1 in one direction may be longer than the length OAL2 of the second light transmitting portion OA2 in the one direction. Alternatively, in an embodiment of the present inventive concept, the length OAL1 of the first light transmitting portion OA1 in one direction may be about the same as the length OAL2 of the second light transmitting portion OA2 in the one direction.

Figure 10:
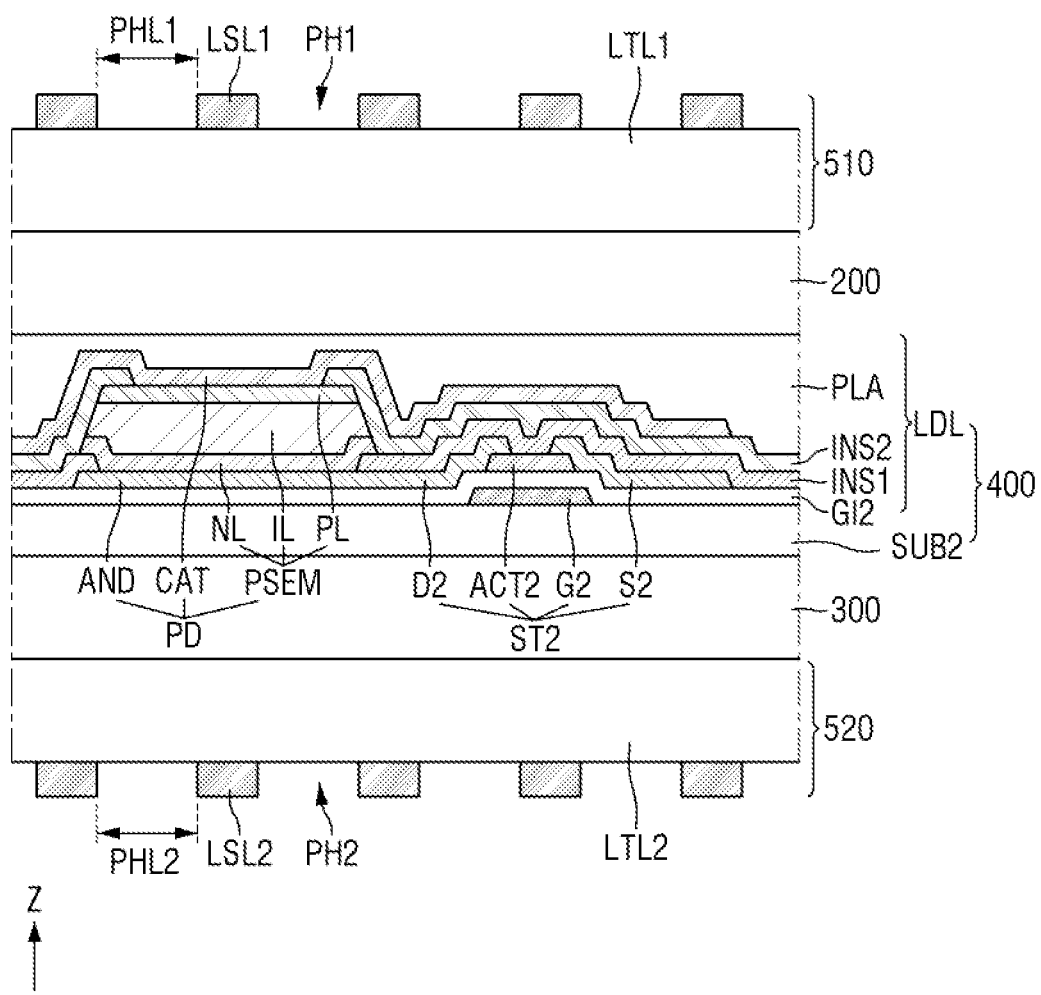
FIG. 10 is a cross-sectional view illustrating another example of the first light transmission control unit, the second light transmission control unit, and the fingerprint sensor of FIGS. 3 and 4.

FIG. 10 is a cross-sectional view illustrating another example of the first light transmission control unit, the second light transmission control unit, and the fingerprint sensor of FIGS. 3 and 4.

The embodiment of FIG. 10 is different from the embodiment of FIG. 6 in that the first light guide unit 510 includes a first light transmitting layer LTL1 and a first light blocking layer LSL1 instead of the first lens array LA1, and the second light guide unit 520 includes a second light transmitting layer LTL2 and a second light blocking layer LSL2 instead of the second lens array LA2. In FIG. 10, a description will be made mainly on differences from the embodiment of FIG. 6.

Referring to FIG. 10, the first light transmitting layer LTL1 may be disposed on the first light transmission control unit 200, and the first light blocking layer LSL1 may be disposed on the first light transmitting layer LTL1. The second light transmitting layer LTL2 may be disposed under the second light transmission control unit 300, and the second light blocking layer LSL2 may be disposed under the second light transmitting layer LTL2.

Each of the first light transmitting layer LTL1 and the second light transmitting layer LTL2 may be made of an insulating material that transmits light. For example, each of the first light transmitting layer LTL1 and the second light transmitting layer LTL2 may be formed of an organic layer including, for example, an acrylic resin, an epoxy resin, a phenolic resin, a polyamide resin, or a polyimide resin.

Each of the first light blocking layer LSL1 and the second light blocking layer LSL2 may include a light-transmittable photosensitive resin which includes such as, for example, an inorganic black pigment such as carbon black or an organic black pigment. Alternatively, each of the first light blocking layer LSL1 and the second light blocking layer LSL2 may include a metal material that does not transmit light or has low light transmittance. For example, each of the first light blocking layer LSL1 and the second light blocking layer LSL2 may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof.

Each of the first pin holes PH1 may be defined by the first light blocking layer LSL1, and may be a path through which light reflected from the fingerprint of the finger F passes. In an embodiment of the present inventive concept, the first light blocking layer LSL1 may be disposed to surround each of the first pin holes PH1, and may be disposed between the first pin holes PH1 in one direction which may be a direction perpendicular to the third direction (Z-axis direction). For example, the first pin holes PH1 and portions of the first light blocking layer LSL1 may be alternately arranged in the one direction.

Each of the second pin holes PH2 may be defined by the second light blocking layer LSL2, and may be a path through which light reflected from the fingerprint of the finger F passes. In an embodiment of the present inventive concept, the second light blocking layer LSL2 may be disposed to surround each of the second pin holes PH2, and may be disposed between the second pin holes PH2 in one direction which may be a direction perpendicular to the third direction (Z-axis direction). For example, the second pin holes PH2 and portions of the second light blocking layer LSL2 may be alternately arranged in the one direction.

Although it is illustrated in FIG. 10 that the first pin holes PH1 are included in the first light guide unit 510 which is a separate member from the first display panel 110, the present inventive concept is not limited thereto. The first pin holes PH1 may be disposed between the first substrate SUB1 and first buffer layer BF1 of the first display panel 110. Further, although it is illustrated in FIG. 10 that the second pin holes PH2 are included in the second light guide unit 520 which is a separate member from the second display panel 120, the present inventive concept is not limited thereto. The second pin holes PH2 may be disposed between the first substrate SUB1 and first buffer layer BF1 of the second display panel 120.

The minimum distance between the first light guide unit 510 and the light sensing element PD may be different from the minimum distance between the second light guide unit 520 and the light sensing element PD. Thus, the length PHL1 of the first pin hole PH1 in one direction may be different from the length PHL2 of the second pin hole PH2 in the one direction. For example, when the minimum distance between the first light guide unit 510 and the light sensing element PD is shorter than the minimum distance between the second light guide unit 520 and the light sensing element PD, the length PHL1 of the first pin hole PH1 in one direction may be longer than the length PHL2 of the second pin hole PH2 in the one direction. Alternatively, in an embodiment of the present inventive concept, the length PHL1 of the first pin hole PH1 in one direction may be about the same as the length PHL2 of the second pin hole PH2 in the one direction.

The first light blocking layer LSL1 of FIG. 10 serves to form the first pin hole PH1, whereas the first light blocking portion LSA1 of FIG. 9 serves to form the first collimator COM1. Therefore, the height of the first light blocking layer LSL1 of FIG. 10 (the length thereof in the third direction (Z-axis direction)) may be lower than the height of the first light blocking portion LSA1 of FIG. 9 (the length thereof in the third direction (Z-axis direction)).

The second light blocking layer LSL2 of FIG. 10 serves to form the second pin hole PH2, whereas the second light blocking portion LSA2 of FIG. 9 serves to form the second collimator COM2. Therefore, the height of the second light blocking layer LSL2 of FIG. 10 (the length thereof in the third direction (Z-axis direction)) may be lower than the height of the second light blocking portion LSA2 of FIG. 9 (the length thereof in the third direction (Z-axis direction)).

Figure 11:
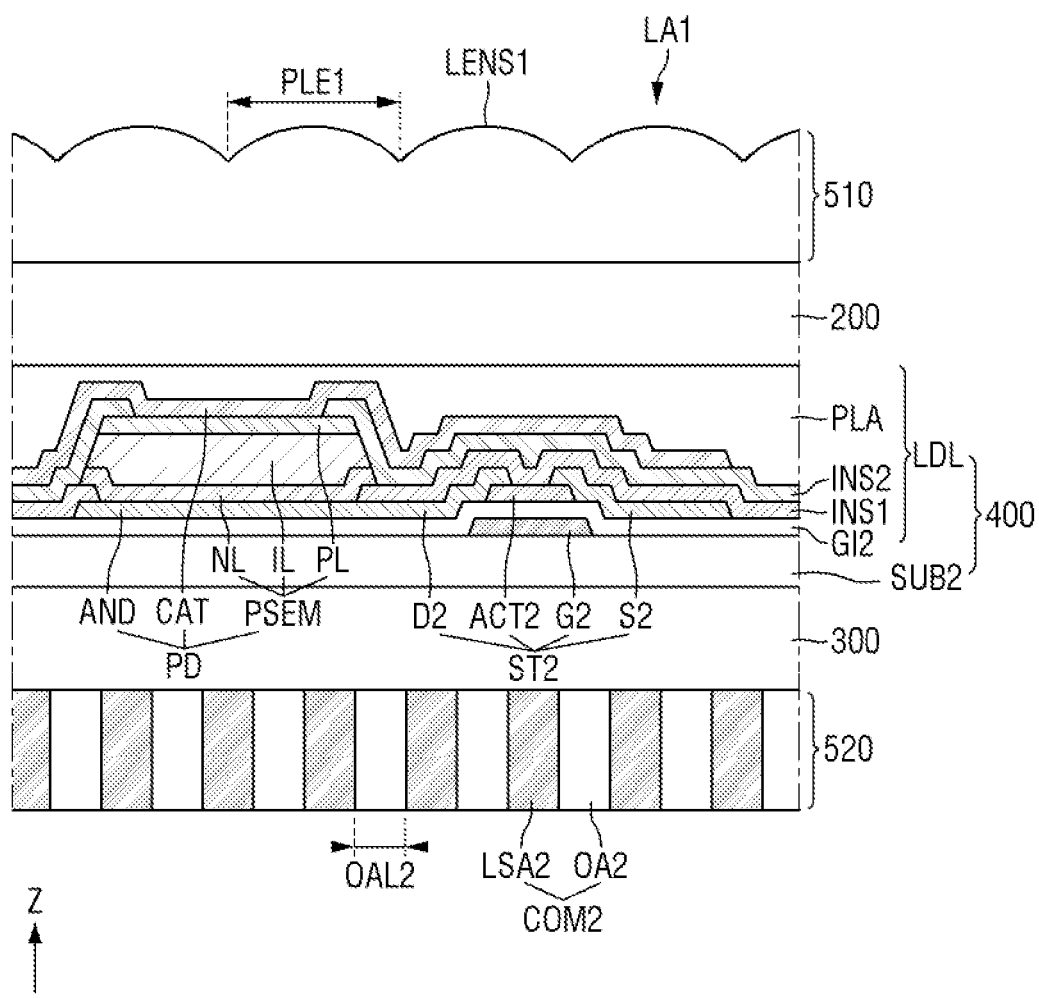
FIG. 11 is a cross-sectional view illustrating another example of the first light transmission control unit, the second light transmission control unit, and the fingerprint sensor of FIGS. 3 and 4.

FIG. 11 is a cross-sectional view illustrating another example of the first light transmission control unit, the second light transmission control unit, and the fingerprint sensor of FIGS. 3 and 4.

The embodiment of FIG. 11 is different from the embodiment of FIG. 6 in that the second light guide unit 520 includes a second collimator COM2 instead of the second lens array LA2. In FIG. 11, a description overlapping the embodiment of FIG. 6 will be omitted.

The second collimator COM2 shown in FIG. 11 may be substantially the same as that described with reference to FIG. 9. Therefore, in FIG. 11, a description of the second collimator COM2 will be omitted.

Different from that described in the embodiment of FIG. 11, in an embodiment of the present inventive concept, the first light guide unit 510 may include a first collimator COM1 instead of the first lens array LA1 of FIG. 11, and the second light guide unit 520 may include a second lens array LA2 instead of the second collimator COM2 of FIG. 11.

Figure 12:
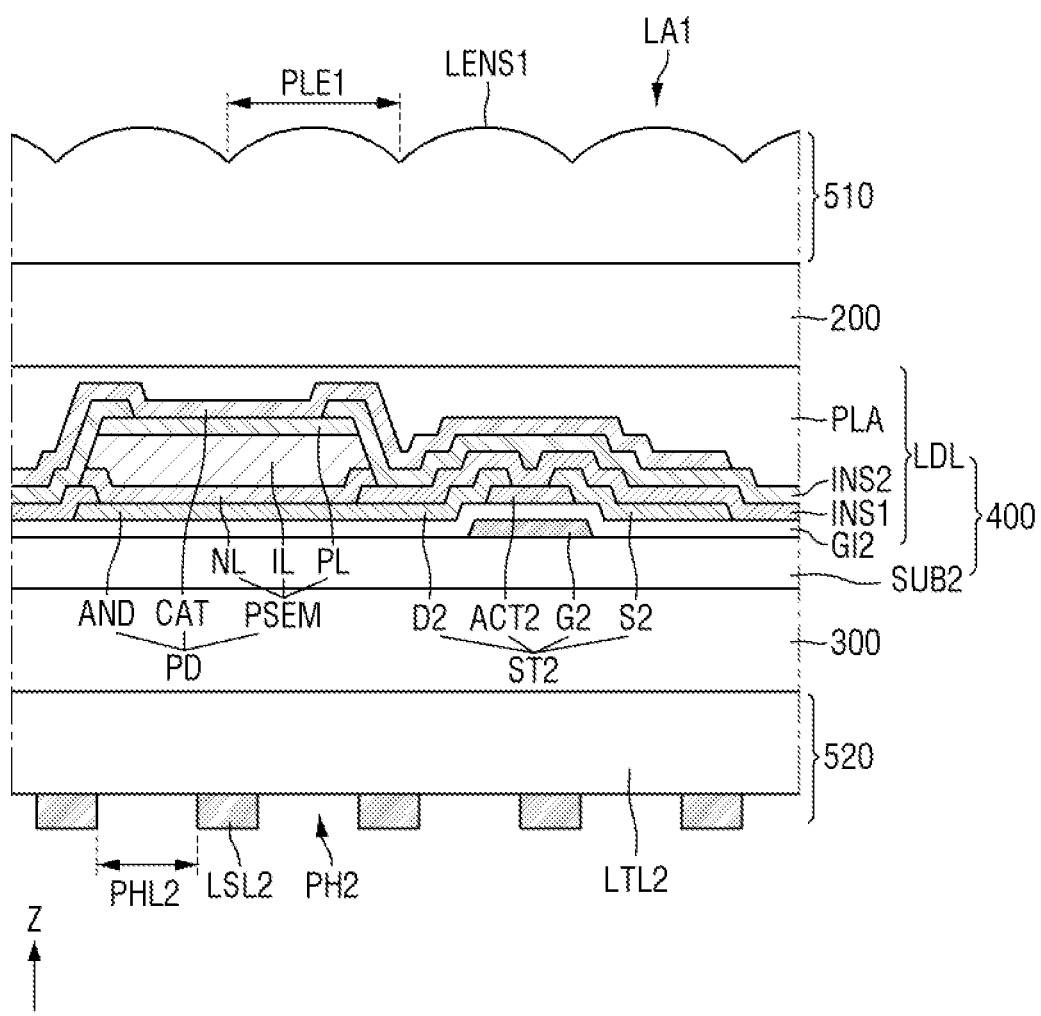
FIG. 12 is a cross-sectional view illustrating another example of the first light transmission control unit, the second light transmission control unit, and the fingerprint sensor of FIGS. 3 and 4.

FIG. 12 is a cross-sectional view illustrating another example of the first light transmission control unit, the second light transmission control unit, and the fingerprint sensor of FIGS. 3 and 4.

The embodiment of FIG. 12 is different from the embodiment of FIG. 6 in that the second light guide unit 520 includes a second light transmitting layer LTL2 and a second light blocking layer LSL2 instead of the second lens array LA2. In FIG. 12, a description overlapping the embodiment of FIG. 6 will be omitted.

The second light transmitting layer LTL2 and the second light blocking layer LSL2, shown in FIG. 12, may be substantially the same as those described with reference to FIG. 10. Therefore, in FIG. 12, descriptions of the second light transmitting layer LTL2 and the second light blocking layer LSL2 will be omitted.

Different from that described in the embodiment of FIG. 12, in an embodiment of the present inventive concept, the first light guide unit 510 may include a first light transmitting layer LTL1 and a first light blocking layer LSL1 instead of the first lens array LA1 of FIG. 12, and the second light guide unit 520 may include a second lens array LA2 instead of the second light transmitting layer LTL2 and the second light blocking layer LSL2 of FIG. 12.

Figure 13:
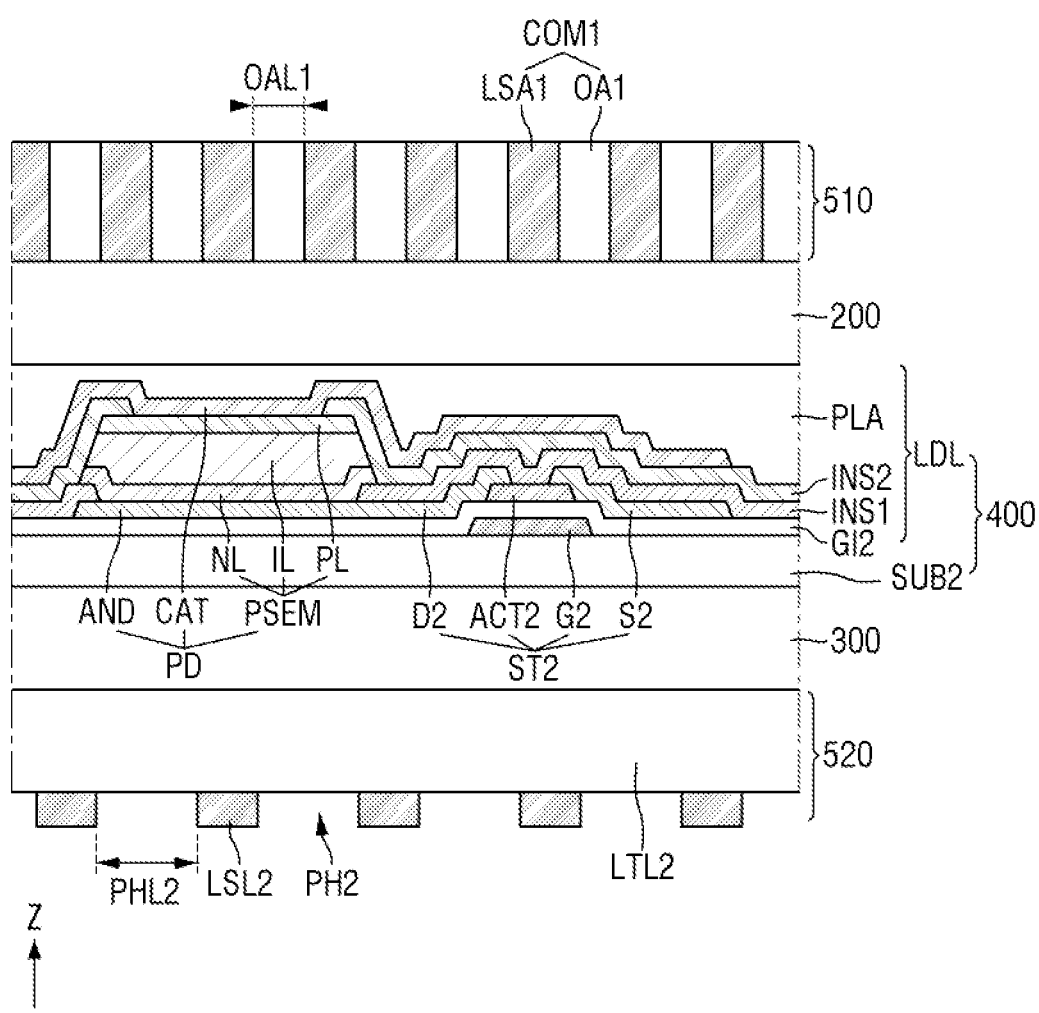
FIG. 13 is a cross-sectional view illustrating another example of the first light transmission control unit, the second light transmission control unit, and the fingerprint sensor of FIGS. 3 and 4.

FIG. 13 is a cross-sectional view illustrating another example of the first light transmission control unit, the second light transmission control unit, and the fingerprint sensor of FIGS. 3 and 4.

The embodiment of FIG. 13 is different from the embodiment of FIG. 9 in that the second light guide unit 520 includes a second light transmitting layer LTL2 and a second light blocking layer LSL2 instead of the second collimator COM2. In FIG. 13, a description overlapping the embodiment of FIG. 9 will be omitted.

The second light transmitting layer LTL2 and the second light blocking layer LSL2, shown in FIG. 13, may be substantially the same as those described with reference to FIG. 10. Therefore, in FIG. 13, descriptions of the second light transmitting layer LTL2 and the second light blocking layer LSL2 will be omitted.

Different from that described in the embodiment of FIG. 13, in an embodiment of the present inventive concept, the first light guide unit 510 may include a first light transmitting layer LTL1 and a first light blocking layer LSL1 instead of the first collimator COM1 of FIG. 13, and the second light guide unit 520 may include a second collimator COM2 instead of the second light transmitting layer LTL2 and the second light blocking layer LSL2 of FIG. 13.

FIG. 14 is a cross-sectional view illustrating another example of the first light transmission control unit, the second light transmission control unit, and the fingerprint sensor of FIGS. 3 and 4.

The embodiment of FIG. 14 is different from the embodiment of FIG. 6 in that the positions of the first light transmission control unit 200 and the first light guide unit 510 are replaced by each other, i.e., their positions are switched, and the positions of the second light transmission control unit 300 and the second light guide unit 520 are replaced by each other, i.e., their positions are switched. In FIG. 14, a description overlapping the embodiment of FIG. 6 will be omitted.

As shown in FIG. 14, the first light guide unit 510 may be disposed on the fingerprint sensor 400, and the first light transmission control unit 200 may be disposed on the first light guide unit 510. Further, the second light guide unit 520 may be disposed under the fingerprint sensor 400, and the second light transmission control unit 300 may be disposed under the second light guide unit 520.

Figure 15:
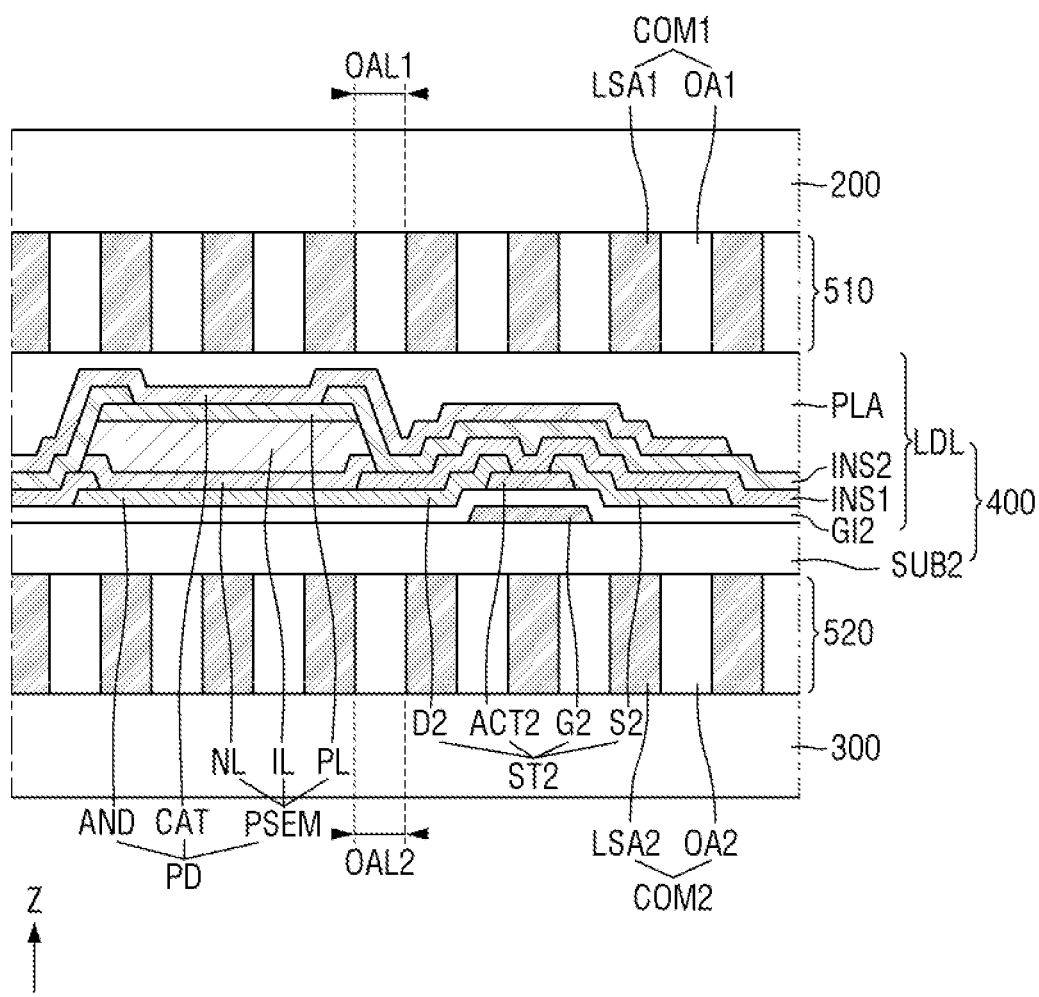
FIG. 15 is a cross-sectional view illustrating another example of the first light transmission control unit, the second light transmission control unit, and the fingerprint sensor of FIGS. 3 and 4.

FIG. 15 is a cross-sectional view illustrating another example of the first light transmission control unit, the second light transmission control unit, and the fingerprint sensor of FIGS. 3 and 4.

The embodiment of FIG. 15 is different from the embodiment of FIG. 9 in that the positions of the first light transmission control unit 200 and the first light guide unit 510 are replaced by each other, i.e., their positions are switched, and the positions of the second light transmission control unit 300 and the second light guide unit 520 are replaced by each other, i.e., their positions are switched. In FIG. 15, a description overlapping the embodiment of FIG. 9 will be omitted.

Figure 16:
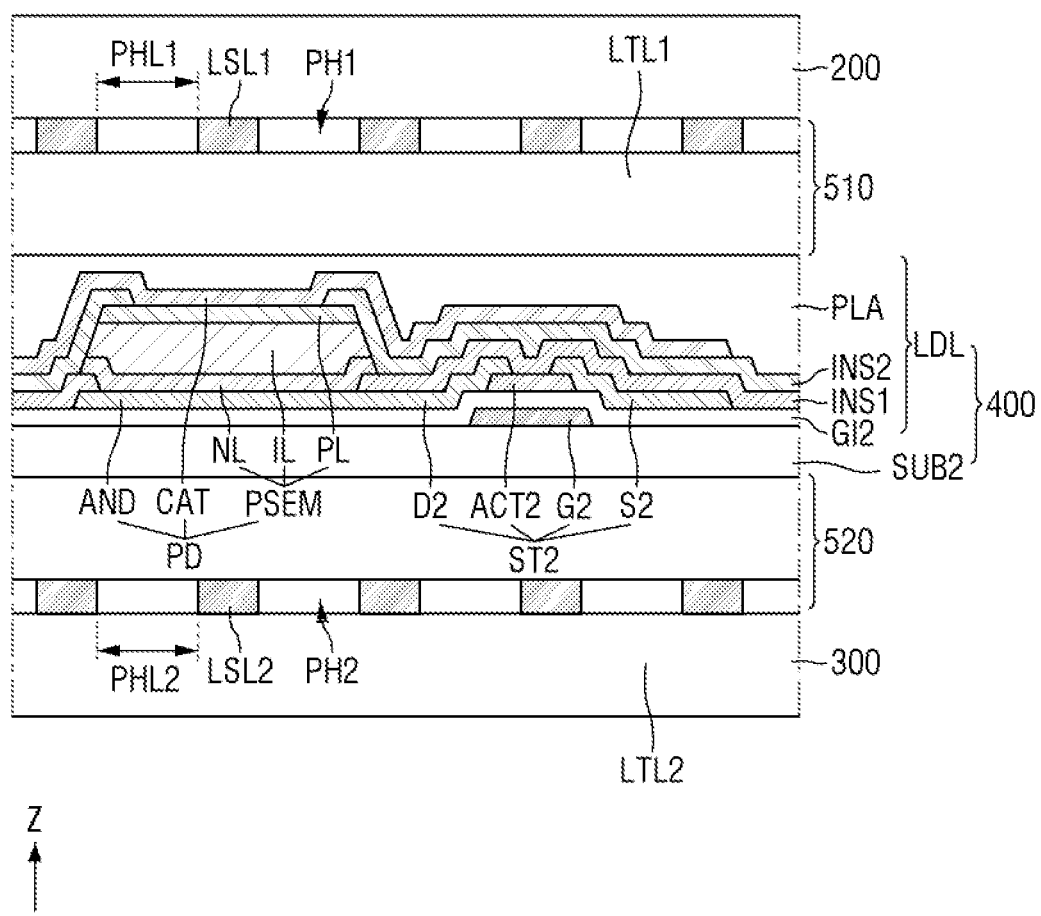
FIG. 16 is a cross-sectional view illustrating another example of the first light transmission control unit, the second light transmission control unit, and the fingerprint sensor of FIGS. 3 and 4.

FIG. 16 is a cross-sectional view illustrating another example of the first light transmission control unit, the second light transmission control unit, and the fingerprint sensor of FIGS. 3 and 4.

The embodiment of FIG. 16 is different from the embodiment of FIG. 10 in that the positions of the first light transmission control unit 200 and the first light guide unit 510 are replaced by each other, i.e., their positions are switched, and the positions of the second light transmission control unit 300 and the second light guide unit 520 are replaced by each other, i.e., their positions are switched. In FIG. 16, a description overlapping the embodiment of FIG. 10 will be omitted.

Figure 17:
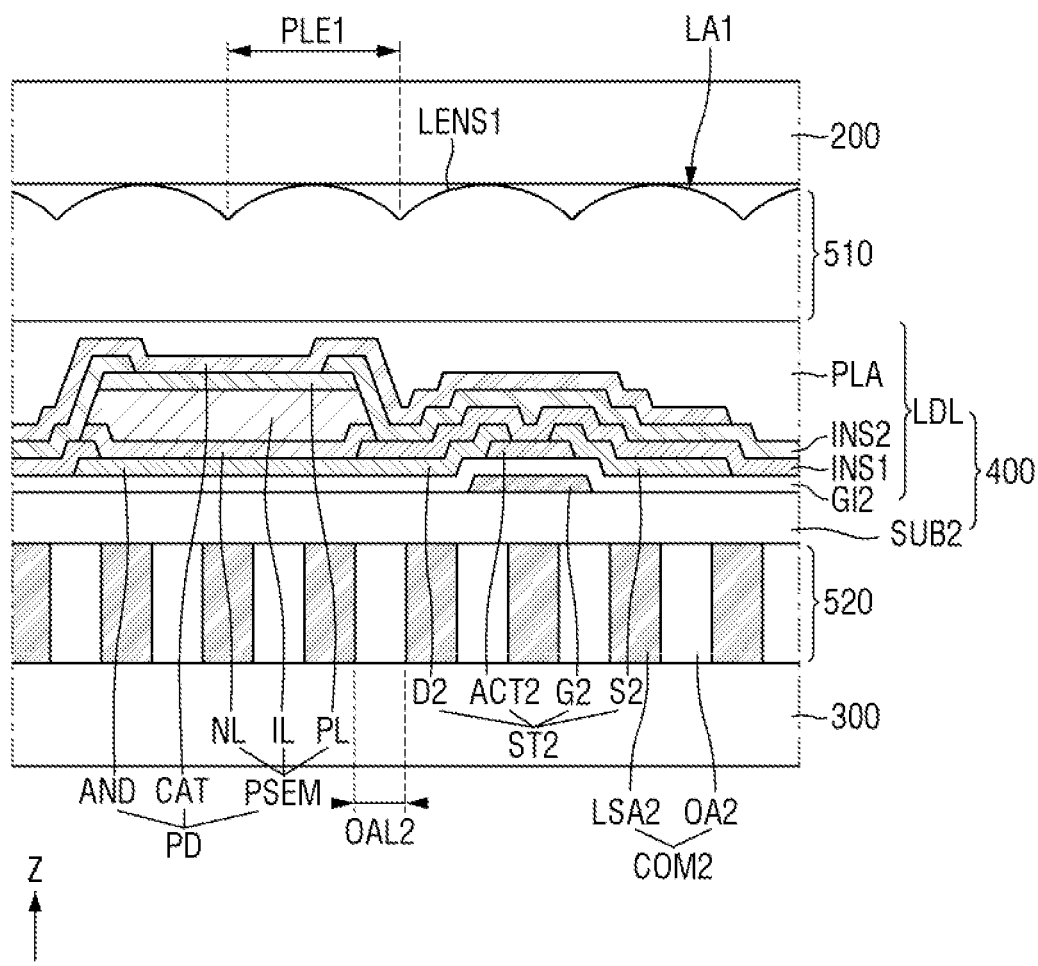
FIG. 17 is a cross-sectional view illustrating another example of the first light transmission control unit, the second light transmission control unit, and the fingerprint sensor of FIGS. 3 and 4.

FIG. 17 is a cross-sectional view illustrating another example of the first light transmission control unit, the second light transmission control unit, and the fingerprint sensor of FIGS. 3 and 4.

The embodiment of FIG. 17 is different from the embodiment of FIG. 11 in that the positions of the first light transmission control unit 200 and the first light guide unit 510 are replaced by each other, i.e., their positions are switched, and the positions of the second light transmission control unit 300 and the second light guide unit 520 are replaced by each other, i.e., their positions are switched. In FIG. 17, a description overlapping the embodiment of FIG. 11 will be omitted.

Figure 18:
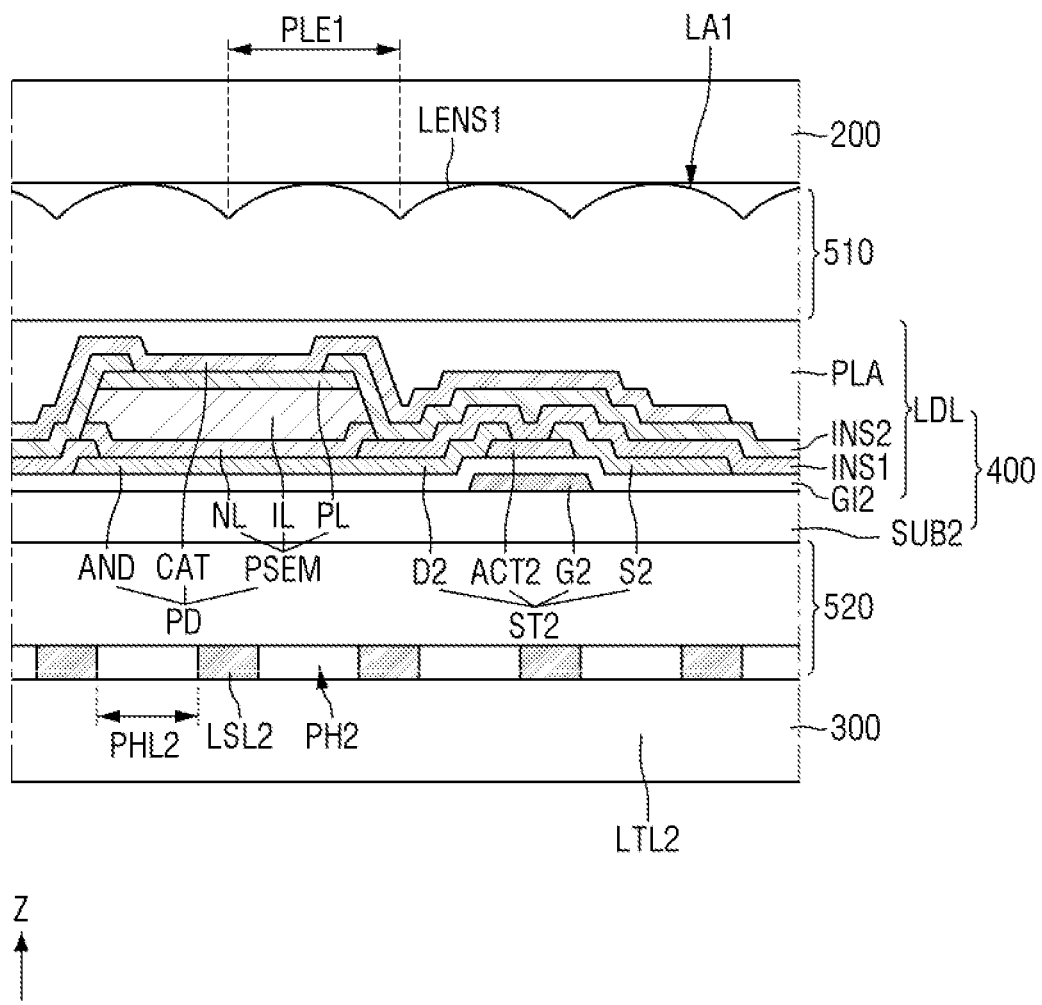
FIG. 18 is a cross-sectional view illustrating another example of the first light transmission control unit, the second light transmission control unit, and the fingerprint sensor of FIGS. 3 and 4.

FIG. 18 is a cross-sectional view illustrating another example of the first light transmission control unit, the second light transmission control unit, and the fingerprint sensor of FIGS. 3 and 4.

The embodiment of FIG. 18 is different from the embodiment of FIG. 12 in that the positions of the first light transmission control unit 200 and the first light guide unit 510 are replaced by each other, i.e., their positions are switched, and the positions of the second light transmission control unit 300 and the second light guide unit 520 are replaced by each other, i.e., their positions are switched. In FIG. 18, a description overlapping the embodiment of FIG. 12 will be omitted.

Figure 19:
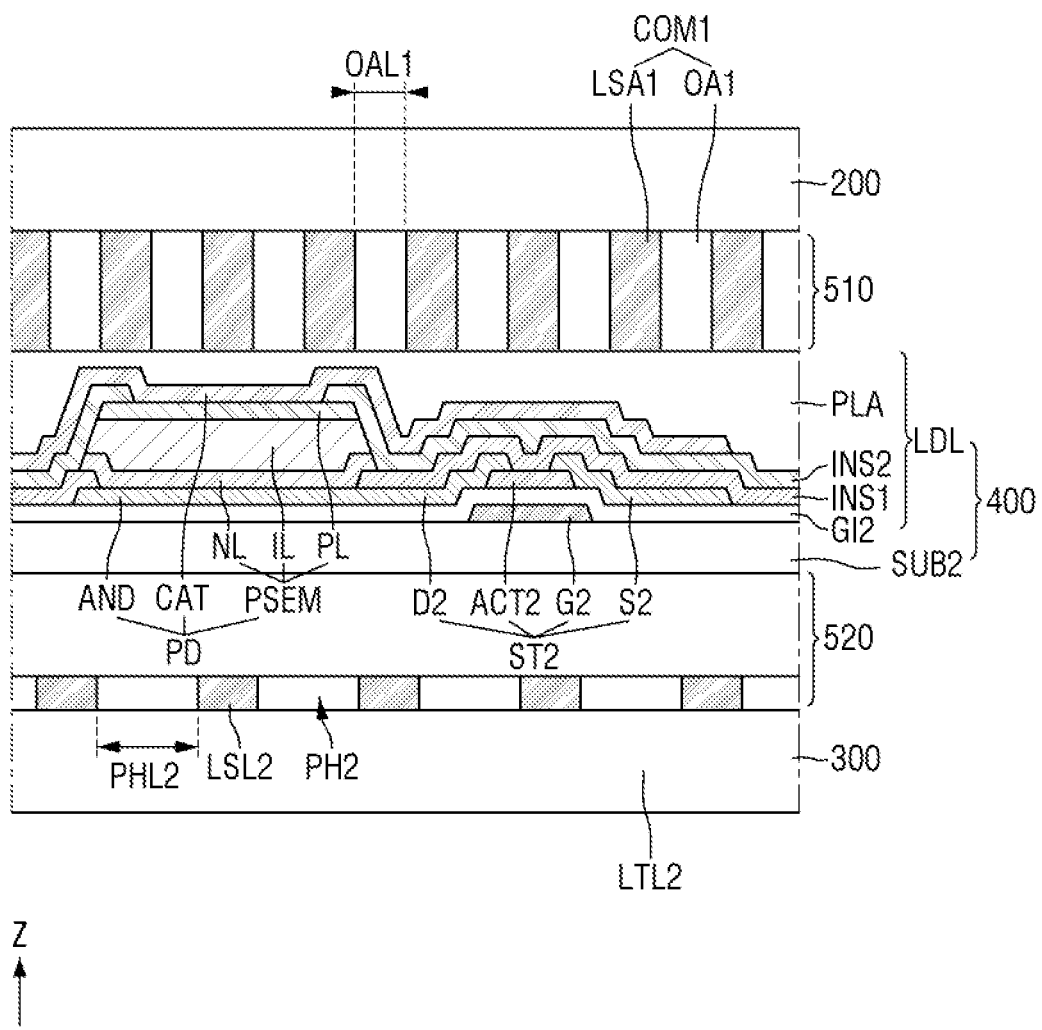
FIG. 19 is a cross-sectional view illustrating another example of the first light transmission control unit, the second light transmission control unit, and the fingerprint sensor of FIGS. 3 and 4.

FIG. 19 is a cross-sectional view illustrating another example of the first light transmission control unit, the second light transmission control unit, and the fingerprint sensor of FIGS. 3 and 4.

The embodiment of FIG. 19 is different from the embodiment of FIG. 13 in that the positions of the first light transmission control unit 200 and the first light guide unit 510 are replaced by each other, i.e., their positions are switched, and the positions of the second light transmission control unit 300 and the second light guide unit 520 are replaced by each other, i.e., their positions are switched. In FIG. 19, a description overlapping the embodiment of FIG. 13 will be omitted.

Figure 20:
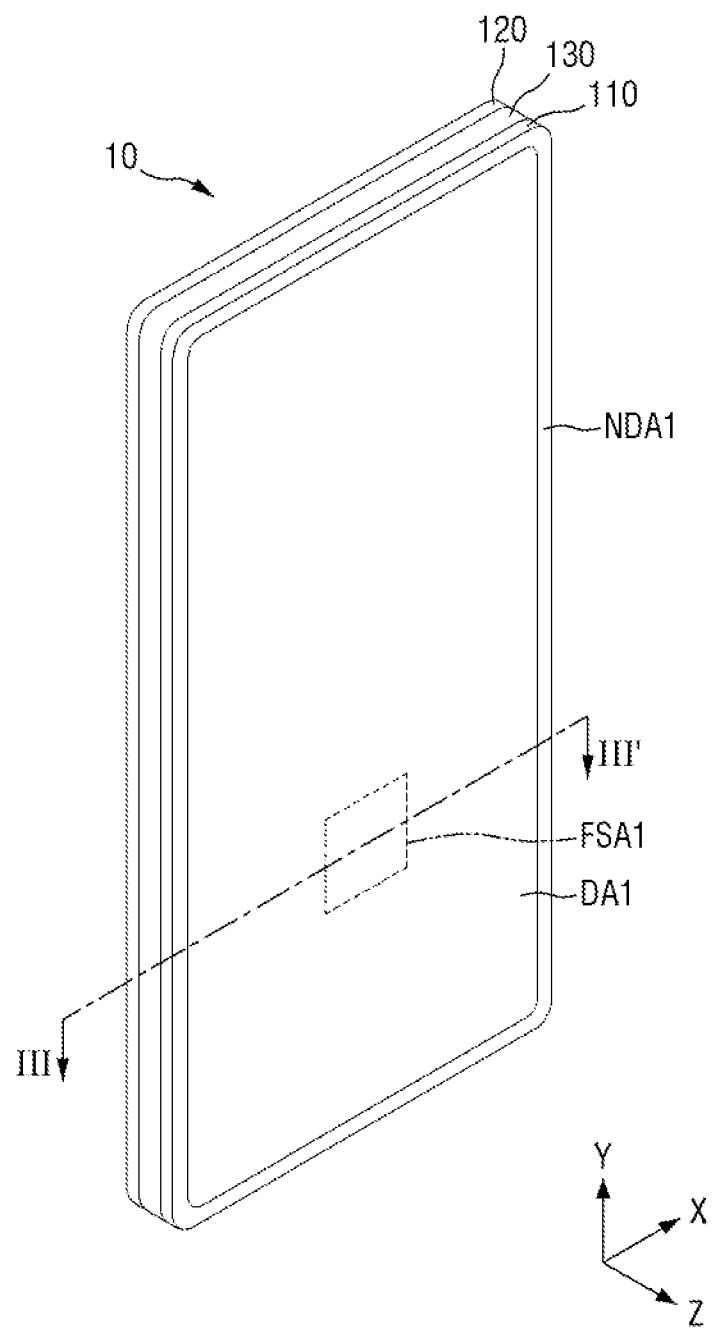
FIGS. 20 and 21 are perspective views illustrating display devices according to an embodiment of the present inventive concept.
Figure 21:
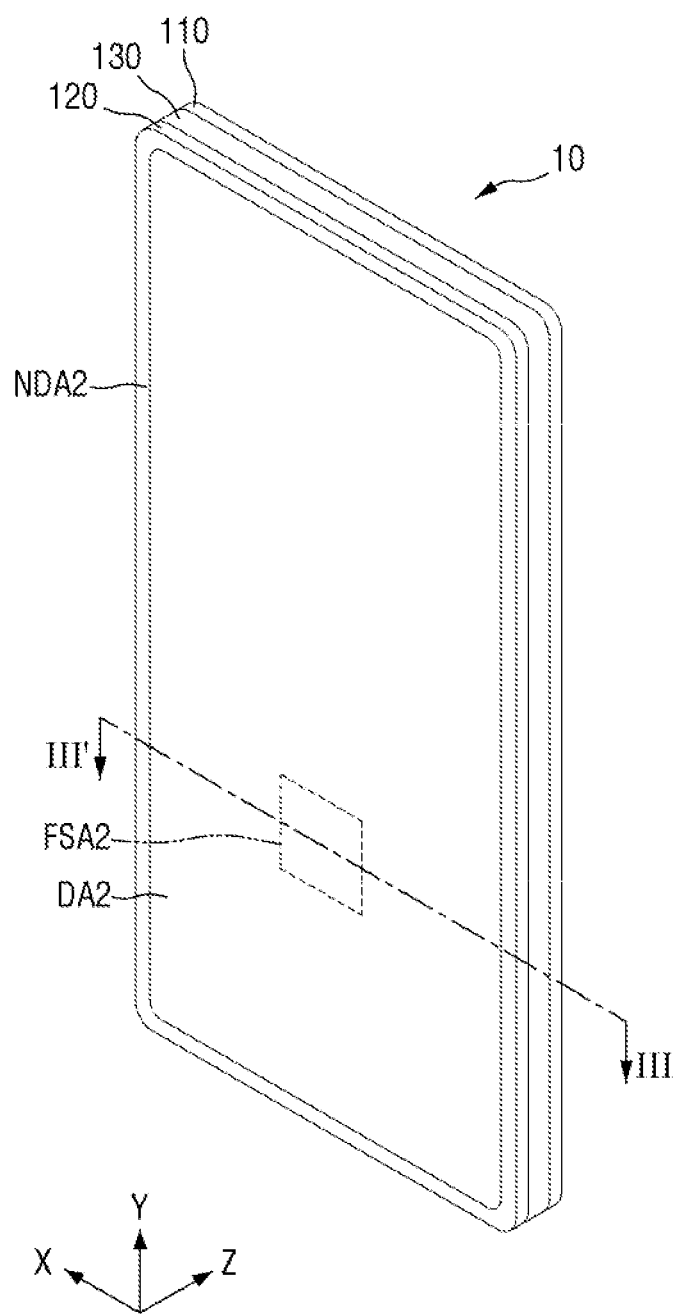
Figure 22A:
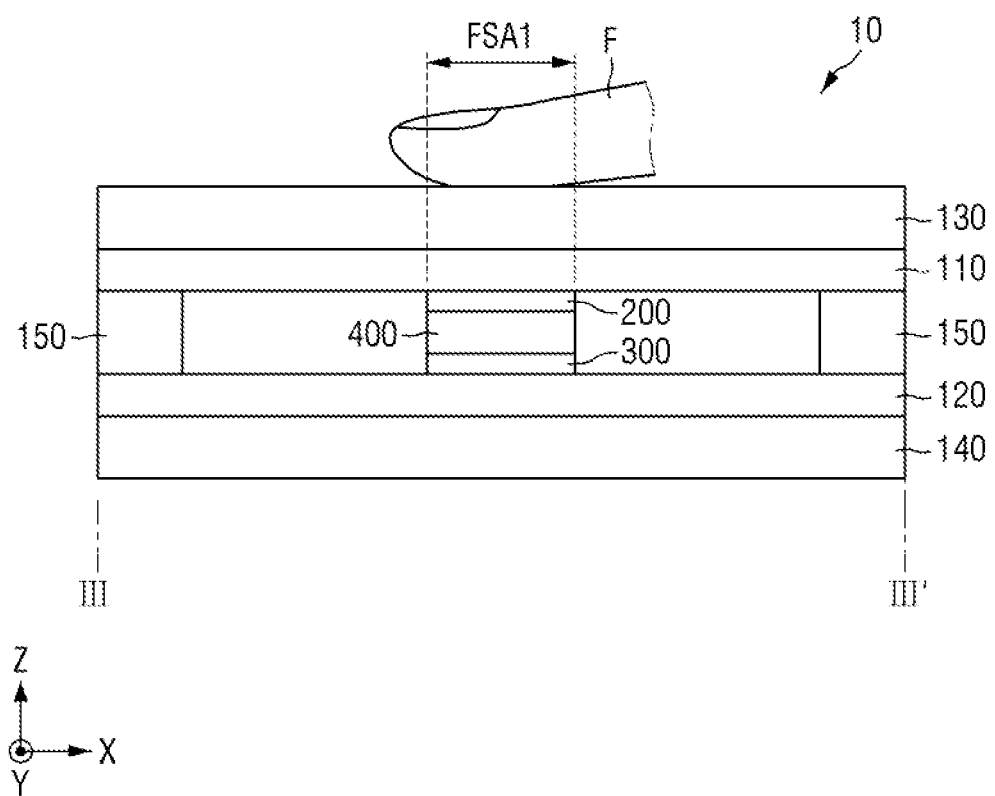

FIGS. 20 and 21 are perspective views illustrating display devices according to an embodiment of the present inventive concept. FIGS. 22A and 22B are cross-sectional views illustrating display devices according to an embodiment of the present inventive concept.

The embodiments of FIGS. 20 to 22B are different from the embodiments of FIGS. 1 to 4 in that the second display panel 120 is not bent or folded. In FIGS. 20 to 22B, differences from the embodiments of FIGS. 1 to 4 will be mainly described.

Referring to FIGS. 20 to 22B, the second display panel 120 may have a rectangular planar shape. The second display panel 120 may have short sides in the first direction (X-axis direction) and long sides in the second direction (Y-axis direction). A corner where the short side in the first direction (X-axis direction) and the long side in the second direction (Y-axis direction) of the second display panel 120 meet each other may be formed to have a round shape with a predetermined curvature or may be formed to be right-angled. The planar shape of the second display panel 120 is not limited to a rectangle, and the second display panel 120 may be formed in the shape of, for example, another polygon (e.g., square, triangle, or other shapes with more than four sides) other than the rectangle, a circle, or an ellipse.

The second display panel 120 includes a second display area DA2 and a second non-display area NDA2. The second display area DA2 is an area in which pixels are arranged to display an image. The second non-display area NDA2 is an area that does not display an image because pixels are not disposed, and may be disposed around the second display area DA2. For example, the second non-display area NDA2 may be disposed to surround the second display area DA2. The second display area DA2 of the second display panel 120 may be disposed on the rear surface of the display device 10 and facing toward the rear direction.

The size or area of the second display panel 120 may be substantially the same as the size or area of the first display panel 110, but the present inventive concept is not limited thereto.

The adhesive member 150 may be disposed at an edge of the first display panel 110 and an edge of the second display panel 120. For example, the adhesive member 150 may overlap the first non-display area NDA1 of the first display panel 110 in the third direction (Z-axis direction). Also, the adhesive member 150 may overlap the second non-display area NDA2 of the second display panel 120 in the third direction (Z-axis direction). The space between the first display panel 110 and the second display panel 120 may be sealed by the adhesive member 150.

As shown in FIGS. 20 to 22B, the display device 10 may display a first image in the front direction using the first display panel 110, and may display a second image in the rear direction using the second display panel 120. For example, the display device 10 may display images on the front and rear surfaces thereof, that is, both the surfaces thereof.

Figure 23:
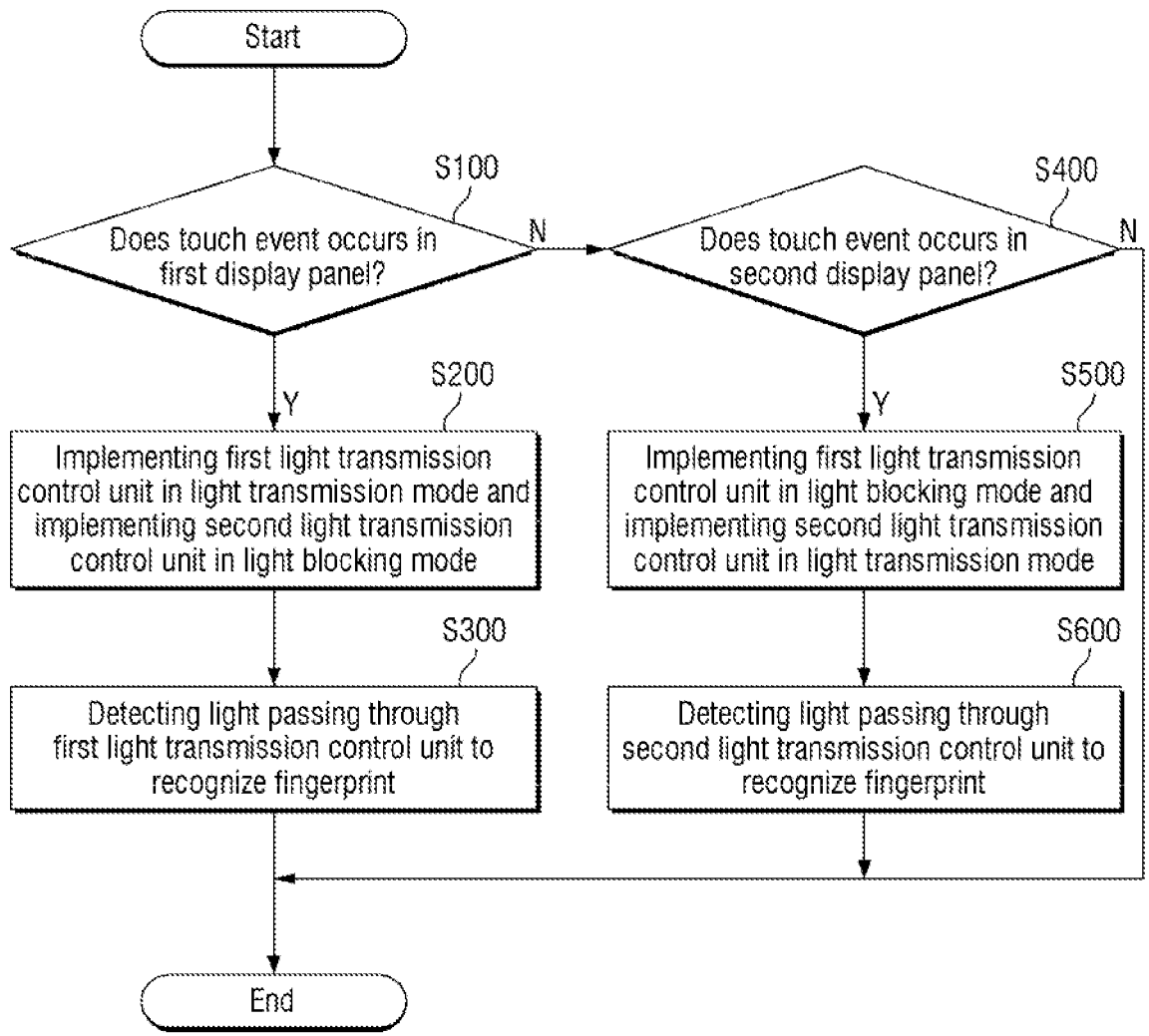
FIG. 23 is a flowchart illustrating a method of driving a display device according to an embodiment of the present inventive concept.

FIG. 23 is a flowchart illustrating a method of driving a display device according to an embodiment of the present inventive concept.

Hereinafter, a method of driving the display device shown in FIGS. 1 to 4 will be described with reference to FIG. 23. However, a method of driving the display device shown in FIGS. 20, 21, 22A, and 22B may be substantially the same as the method described with reference to FIG. 23.

First, it is determined whether a touch event occurs in the first display panel 110 (S100 in FIG. 23).

Since the first display panel 110 includes the touch sensing layer SENL as shown in FIG. 5, the display device 10 may detect a touch event in which a user touches the first display panel 110. For example, the touch driving circuit may be electrically connected to the driving electrodes TE and sensing electrodes RE of the touch sensing layer SENL of the first display panel 110. The touch driving circuit may apply driving signals to the driving electrodes TE of the first display panel 110 and may detect first mutual capacitance values formed between the driving electrodes TE and the sensing electrodes RE. The touch driving circuit may determine whether a touch event has occurred in the first display panel 110 according to the first mutual capacitance values.

The touch event includes a case where an object such as a user's finger or a pen directly contacts the front surface of the first display panel 110 disposed on the touch sensing layer SENL. Further, the touch event includes a case where an object such as a user's finger or a pen is located closely (hovered) on the front surface of the first display panel 110.

Second, when the touch event occurs in the first display panel 110, the first light transmission control unit 200 is implemented in a light transmission mode, and the second light transmission control unit 300 is implemented in a light blocking mode. Then, the fingerprint sensor 400 detects the light passing through the first light transmission control unit 200 and recognizes the fingerprint of the finger F (S200, S300 in FIG. 23).

The first light transmission control unit 200 is disposed between the first display panel 110 and the fingerprint sensor 400. When the first light transmission control unit 200 is implemented in the light transmission mode for transmitting light, the light output from the first display panel 110 and reflected from the fingerprint of the finger F may pass through the first display panel 110 and the first light transmission control unit 200, and may be incident on the light sensing element PD of each of the sensor pixels SEP of the fingerprint sensor 400.

The amount of light reflected from the ridge of the fingerprint of the finger F and the amount of light reflected from the valley thereof are different from each other. Therefore, the fingerprint driving circuit electrically connected to the fingerprint sensor 400 may determine whether light is reflected from the ridge of the fingerprint of the finger F or from the valley thereof depending on the amount of light incident on the sensor pixels of the fingerprint sensor 400. For example, the fingerprint sensor 400 disposed between the first display panel 110 and the second display panel 120 may detect the light, which may contain the fingerprint information, passing through the first display panel 110. Accordingly, the display device 10 may detect the fingerprint of the finger F that has contacted the first display panel 110.

The second light transmission control unit 300 is disposed between the second display panel 120 and the fingerprint sensor 400. The second light transmission control unit 300 is implemented in the light blocking mode for blocking light, thereby preventing the noise light passing through the second display panel 120 from being incident on the fingerprint sensor 400. Therefore, it is possible to prevent the accuracy of fingerprint recognition from being lowered by the noise light passing through the second display panel 120.

Third, when a touch event does not occur in the first display panel 110, it is determined whether a touch event occurs in the second display panel 120 (S400 in FIG. 23).

Since the second display panel 120 includes the touch sensing layer SENL as shown in FIG. 5, the display device 10 may detect a touch event in which a user touches the second display panel 120. For example, the touch driving circuit may be electrically connected to the driving electrodes TE and sensing electrodes RE of the touch sensing layer SENL of the second display panel 120. The touch driving circuit may apply driving signals to the driving electrodes TE of the second display panel 120 and may detect second mutual capacitance values formed between the driving electrodes TE and the sensing electrodes RE. The touch driving circuit may determine whether a touch event has occurred in the second display panel 120 according to the second mutual capacitance values. The touch event includes a case where an object such as a user's finger or a pen directly contacts the front surface of the second display panel 120 disposed on the touch sensing layer SENL. Further, the touch event includes a case where an object such as a user's finger or a pen is located closely (hovered) on the front surface of the second display panel 120.

Fourth, when the touch event occurs in the second display panel 120, the first light transmission control unit 200 is implemented in a light blocking mode, and the second light transmission control unit 300 is implemented in a light transmission mode. Then, the fingerprint sensor 400 detects the light passing through the second light transmission control unit 300 and recognizes the fingerprint of the finger F (S500, S600 in FIG. 23).

When the second light transmission control unit 300 is implemented in the light transmission mode for transmitting light, the light output from the second display panel 120 and reflected from the fingerprint of the finger F may pass through the second display panel 120 and the second light transmission control unit 300, and may be incident on the light sensing element PD of each of the sensor pixels SEP of the fingerprint sensor 400.

The amount of light reflected from the ridge of the fingerprint of the finger F and the amount of light reflected from the valley thereof are different from each other. Therefore, the fingerprint driving circuit electrically connected to the fingerprint sensor 400 may determine whether light is reflected from the ridge of the fingerprint of the finger F or from the valley thereof depending on the amount of light incident on the sensor pixels of the fingerprint sensor 400. For example, the fingerprint sensor 400 disposed between the first display panel 110 and the second display panel 120 may detect the light, which may contain the fingerprint information, passing through the second display panel 120. Accordingly, the display device 10 may detect the fingerprint of the finger F that has contacted the second display panel 120.

The first light transmission control unit 200 is implemented in the light blocking mode for blocking light, thereby preventing the noise light passing through the first display panel 110 from being incident on the fingerprint sensor 400. Therefore, it is possible to prevent the accuracy of fingerprint recognition from being lowered by the noise light passing through first display panel 110. Thus, the fingerprint sensor 400 disposed between the first display panel 110 and the second display panel 120 may detect the light passing through the first display panel 110 when a touch event occurs in the first display panel 110, and the same fingerprint sensor 400 disposed between the first display panel 110 and the second display panel 120 may detect the light passing through the second display panel 120 when a touch event occurs in the second display panel 120.

In a display device and a method of driving the same according to an embodiment of the present inventive concept, one fingerprint sensor is disposed between a first display panel displaying a first image forward and a second display panel displaying a second image backward. When a user's finger touches the first display panel, a first light transmission control unit disposed between the first display panel and the fingerprint sensor is implemented in a light transmission mode, and a second light transmission control unit disposed between the second display panel and the fingerprint sensor is implemented in a light blocking mode, thereby detecting light reflected from a fingerprint of the finger. Further, when the user's finger touches the second display panel, the first light transmission control unit is implemented in the light blocking mode, and the second light transmission control unit is implemented in the light transmission mode, thereby detecting light reflected from the fingerprint of the finger. Therefore, the display device may detect the fingerprint of the finger contacting the first display panel and the fingerprint of the finger contacting the second display panel by using one fingerprint sensor. Accordingly, since it is not necessary to attach a fingerprint sensor to each display panel, manufacturing cost of the display device can be reduced.

While the present inventive concept has been particularly shown and described with reference to the embodiments thereof, it will be understood by those of ordinary skill in the art that various changes in form and detail may be made therein without departing from the spirit and scope of the present inventive concept as defined by the appended claims.

What is claimed is:

1. A display device, comprising:
a first display panel for displaying a first image;
a fingerprint sensor disposed on one surface of the first display panel and detecting light passing through the first display panel; and
a first light transmission control unit disposed between the first display panel and the fingerprint sensor for controlling transmission of light,
wherein the first light transmission control unit includes:
   a first base substrate and a second base substrate facing each other;
   a first electrode disposed on one surface of the first base substrate;
   a second electrode disposed on one surface of the second base substrate facing the first base substrate; and
   a light transmission control layer disposed between the first electrode and the second electrode, and
the light transmission control layer includes:
   an electrochromic layer disposed on one surface of the second electrode facing the first electrode and configured to change a color according to an oxidation-reduction reaction by a first driving voltage applied to the first electrode and a second driving voltage applied to the second electrode;
   a counter layer disposed on one surface of the first electrode facing the second electrode and located between the first electrode and the electrochromic layer for assisting the oxidation-reduction reaction of the electrochromic layer; and
   an electrolyte layer disposed between the electrochromic layer and the counter layer for providing cations and anions to cause the oxidation-reduction reaction in the electrochromic layer and the counter layer.

2. The display device of claim 1,
wherein, when the first driving voltage is a positive voltage and the second driving voltage is a negative voltage, the electrochromic layer is in a light blocking mode in which light passing through the first display panel and incident to the fingerprint sensor is blocked.

3. The display device of claim 1,
wherein, when the first driving voltage is a negative voltage and the second driving voltage is a positive voltage, the electrochromic layer is in a light transmission mode in which light passing through the first display panel and incident to the fingerprint sensor is transmitted.

4. The display device of claim 1, further comprising:
a second display panel for displaying a second image; and
a second light transmission control unit disposed between the second display panel and the fingerprint sensor for controlling transmission of light.

5. The display device of claim 4,
wherein, when a touch event occurs in the first display panel, the first light transmission control unit is in a light transmission mode for transmitting light such that light passing through the first display panel is incident on the fingerprint sensor, and the second light transmission control unit is in a light blocking mode for blocking light.

6. The display device of claim 4,
wherein, when a touch event occurs in the second display panel, the second light transmission control unit is in a light transmission mode for transmitting light such that light passing through the second display panel is incident on the fingerprint sensor, and the first light transmission control unit is in a light blocking mode for blocking light.

7. The display device of claim 4, further comprising:
a first light guide unit disposed between the first display panel and the first light transmission control unit for providing light passing through the first display panel to a light sensing element of the fingerprint sensor; and
a second light guide unit disposed between the second display panel and the second light transmission control unit for providing light passing through the second display panel to the light sensing element of the fingerprint sensor.

8. The display device of claim 4, further comprising:
a first light guide unit disposed between the first light transmission control unit and the fingerprint sensor for providing light passing through the first display panel to a light sensing element of the fingerprint sensor; and
a second light guide unit disposed between the second light transmission control unit and the fingerprint sensor for providing light passing through the second display panel to the light sensing element of the fingerprint sensor.

9. A display device, comprising:
a first display panel;
a second display panel disposed on one surface of the first display panel;
a fingerprint sensor disposed between the first display panel and the second display panel;
a first light guide unit disposed between the first display panel and the fingerprint sensor and providing light passing through the first display panel to a light sensing element of the fingerprint sensor;
a second light guide unit disposed between the second display panel and the fingerprint sensor and providing light passing through the second display panel to the light sensing element of the fingerprint sensor;
a first light transmission control unit disposed between the first display panel and the fingerprint sensor; and
a second light transmission control unit disposed between the second display panel and the fingerprint sensor,
wherein, when a touch event occurs in the first display panel, the first light transmission control unit is in a light transmission mode for transmitting light such that light passing through the first display panel is incident on the fingerprint sensor, and the second light transmission control unit is in a light blocking mode for blocking light, and
when a touch event occurs in the second display panel, the second light transmission control unit is in a light transmission mode for transmitting light such that light passing through the second display panel is incident on the fingerprint sensor, and the first light transmission control unit is in a light blocking mode for blocking light.

10. The display device of claim 9,
wherein each of the first light guide unit and the second light guide unit includes any one of a lens array including a plurality of lenses, a collimator including a light transmitting portion transmitting light and a light blocking portion blocking light, and a light blocking layer including pinholes transmitting light.

11. The display device of claim 9,
wherein the first light guide unit includes a lens array including a plurality of lenses, and the second light guide unit includes a collimator including a light transmitting portion transmitting light and a light blocking portion blocking light, or a light blocking layer including pinholes transmitting light.

12. The display device of claim 9,
wherein the first light guide unit includes a collimator including a light transmitting portion transmitting light and a light blocking portion blocking light, and the second light guide unit includes a lens array including a plurality of lenses, or a light blocking layer including pinholes transmitting light.

13. The display device of claim 9,
wherein the first light guide unit includes a light blocking layer including pinholes transmitting light, and the second light guide unit includes a lens array including a plurality of lenses, or a collimator including a light transmitting portion transmitting light and a light blocking portion blocking light.

14. A method of driving a display device, comprising:
determining whether a touch event occurs in a first display panel and a second display panel disposed on one surface of the first display panel;
implementing a first light transmission control unit disposed between the first display panel and a fingerprint sensor in a light transmission mode for transmitting light such that light passing through the first display panel is incident on the fingerprint sensor, when the touch event occurs in the first display panel;
implementing a second light transmission control unit disposed between the second display panel and the fingerprint sensor in a light blocking mode for blocking light, when the touch event occurs in the first display panel;
implementing the second light transmission control unit in a light transmission mode for transmitting light such that light passing through the second display panel is incident on the fingerprint sensor, when the touch event occurs in the second display panel; and
implementing the first light transmission control unit in a light blocking mode for blocking light, when the touch event occurs in the second display panel.

15. A display device, comprising:
a first display panel that is not bent or folded for displaying a first image in a front direction of the display device;
a second display panel that is capable of being bent or folded attached through an adhesion member to the first display panel and displaying a second image in a rear direction of the display device; and
a fingerprint sensor disposed between the first display panel and the second display panel and detecting light passing through the first display panel or light passing through the second display panel, wherein the adhesion member is directly interposed and sandwiched between the first display panel and the second display panel without other components interposed therebetween, and includes a front surface directly attached to the first display panel, and a rear surface facing the front surface and directly attached to the second display panel, and the fingerprint sensor is interposed and sandwiched between the first display panel and the second display panel, disposed within a same layer of the adhesion member, and surrounded by the adhesion member.

16. The display device of claim 15, further comprising:

a first light transmission control unit disposed between the first display panel and the fingerprint sensor; and a second light transmission control unit disposed between the second display panel and the fingerprint sensor, wherein, when a touch event occurs in the first display panel, the first light transmission control unit is in a light transmission mode for transmitting light such that light passing through the first display panel is incident on the fingerprint sensor, and the second light transmission control unit is in a light blocking mode for blocking light, and when a touch event occurs in the second display panel, the second light transmission control unit is in a light transmission mode for transmitting light such that light passing through the second display panel is incident on the fingerprint sensor, and the first light transmission control unit is in a light blocking mode for blocking light.

* * * * *